US011818032B2

(12) United States Patent
Margaria et al.

(10) Patent No.: US 11,818,032 B2
(45) Date of Patent: *Nov. 14, 2023

(54) BANDWIDTH CONSTRAINT FOR MULTIPATH SEGMENT ROUTING

(71) Applicant: Juniper Networks, Inc., Sunnyvale, CA (US)

(72) Inventors: Cyril Margaria, Dublin (IE); Gregory A. Sidebottom, Ottawa (CA); Richard M Chen, Metuchen, NJ (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/058,928

(22) Filed: Nov. 28, 2022

(65) Prior Publication Data

US 2023/0086001 A1    Mar. 23, 2023

Related U.S. Application Data

(63) Continuation of application No. 17/214,617, filed on Mar. 26, 2021, now Pat. No. 11,516,114.

(Continued)

(51) Int. Cl.
*H04L 45/125* (2022.01)
*H04L 41/0806* (2022.01)
(Continued)

(52) U.S. Cl.
CPC ........ *H04L 45/125* (2013.01); *H04L 41/0806* (2013.01); *H04L 41/0896* (2013.01);
(Continued)

(58) Field of Classification Search
None
See application file for complete search history.

(56) References Cited

U.S. PATENT DOCUMENTS 6,976,087 B1 *  12/2005  Westfall ................ H04L 47/762
                                                                 370/351
9,450,817 B1     9/2016  Bahadur et al.
(Continued)

FOREIGN PATENT DOCUMENTS

CN        102271368 A  *  12/2011
CN        102271368 A      12/2011
(Continued)

OTHER PUBLICATIONS

Filsfils, Leddy, D. Voyer, S. Matsushima, Z. Li, SRv6 Network Programming, pp. 1-48, Sep. 28, 2020.*

(Continued)

*Primary Examiner* — Christopher M Crutchfield
(74) *Attorney, Agent, or Firm* — Shumaker & Sieffert, P.A.

(57) ABSTRACT

In an example, a method includes computing, by a computing device, for a segment routing policy that specifies a bandwidth constraint for the segment routing policy, first shortest paths through a network of network nodes, wherein each shortest path of the first shortest paths represents a different sequence of links connecting pairs of the network nodes from a source to a destination; in response to determining, by the computing device based on the bandwidth constraint for the segment routing policy, a link of one of the first shortest paths has insufficient bandwidth to meet a required bandwidth for the link, increasing a metric of the link; computing, by the computing device, for the segment routing policy that specifies the bandwidth constraint, based on the increased metric of the link, second shortest paths through the network of network nodes; and provisioning the second shortest paths in the network of nodes.

20 Claims, 22 Drawing Sheets

Related U.S. Application Data

(60) Provisional application No. 63/133,081, filed on Dec. 31, 2020, provisional application No. 63/085,927, filed on Sep. 30, 2020.

(51) Int. Cl.
*H04L 41/0896* (2022.01)
*H04L 45/12* (2022.01)
*H04L 45/24* (2022.01)
*H04L 45/50* (2022.01)
*H04L 47/125* (2022.01)
*H04L 47/20* (2022.01)
*H04L 45/00* (2022.01)

(52) U.S. Cl.
CPC ............ *H04L 45/123* (2013.01); *H04L 45/24* (2013.01); *H04L 45/34* (2013.01); *H04L 45/50* (2013.01); *H04L 47/125* (2013.01); *H04L 47/20* (2013.01)

(56) References Cited

U.S. PATENT DOCUMENTS

| | | | | |
|---|---|---|---|---|
| 10,148,551 | B1* | 12/2018 | Wood | H04L 45/123 |
| 10,382,592 | B2 | 8/2019 | Paul et al. | |
| 10,536,216 | B1 | 1/2020 | Chhillar et al. | |
| 11,516,114 | B2* | 11/2022 | Margaria | H04L 45/123 |
| 2008/0123533 | A1* | 5/2008 | Vasseur | H04L 45/124 370/238 |
| 2010/0040069 | A1* | 2/2010 | Johri | H04L 45/46 370/400 |
| 2018/0343191 | A1* | 11/2018 | Hao | H04L 45/20 |
| 2018/0343193 | A1* | 11/2018 | Hao | H04L 45/34 |
| 2019/0356600 | A1 | 11/2019 | Barton et al. | |

FOREIGN PATENT DOCUMENTS

| | | |
|---|---|---|
| CN | 105897575 A | 8/2016 |
| CN | 108429685 A | 8/2018 |
| CN | 109257278 A | 1/2019 |
| CN | 111327525 A | 6/2020 |
| CN | 111464440 A | 7/2020 |
| CN | 111464441 A | 7/2020 |
| EP | 3238387 A1 | 11/2017 |

OTHER PUBLICATIONS

KB. Manayya, Constrained Shortest Path First, pp. 1-9, Feb. 20, 2009.*

Huang, Q. Shen, W. Shao, C. Xiaoyu, Optimizing Segment Routing With the Maximum SLD Constraint Using Openflow, pp. 1-18 (Year: 2018).*

First Office Action and Search Report from counterpart Chinese Application No. 202111144017.0 dated Dec. 22, 2022, 13 pp.

Bruce et al., "MPLS: Next Steps—Chapter 5.6 GMPLS and Traffic Engineering," Jul. 11, 2008, 11 pp.

Extended Search Report from counterpart European Application No. 21199767.1 dated Feb. 21, 2022, 12 pp.

Filsfils and Michielson, "SR Traffic-Engineering," Cisco Systems, Mar. 2017, 186 pp.

Filsfils et al., "Segment Routing Architecture," Internet Engineering Task Force (IETF), RFC 8402, Jul. 2018, 33 pp.

Filsfils et al., "Segment Routing Policy Architecture," Spring Working Group, ver. 09, Nov. 1, 2020, 38 pp.

Filsfils et al., "SR Policy Implementation and Deployment Considerations," Spring Working Group, ver. 04, Oct. 9, 2019, 24 pp.

Filsfils et al., "SRv6 Network Programming", draft-filsfils-spring-srv6-network-programming-00, Sep. 28, 2020, 48 pp.

Huang et al., "Optimizing Segment Routing With the Maximum SLD Constraint Using Openflow", IEEE Access, vol. 6, IEEE, Apr. 2018, 18 pp.

Manayya, "Constrained Shortest Path First", Network Working Group, Internet Draft, IETF, Feb. 20, 2009, 8 pp.

Notice of Allowance from U.S. Appl. No. 17/214,617 dated Jul. 6, 2022, 12 pp.

Response to Extended Search Report dated Feb. 21, 2022, from counterpart European Application No. 21199767.1 filed Oct. 3, 2022, 16 pp.

Chang et al., "Dynamic Virtual Routers Using Multiway Segment Tree", 2013 I333 14th International Conference on High Performance Switching and Routing, National Cheng Kung University, Department of Computer Science and Information Engineering, Tainan, Taiwan, Sep. 19, 2013, pp. 171-176.

Gen et al., "Software Defined Content Centric Network's Segment Routing Strategy", China Academic Journal Electronic Publishing House, vol. 35, No. 7, Jul. 2018, pp. 2030-2037.

* cited by examiner

BANDWIDTH CONSTRAINT FOR MULTIPATH SEGMENT ROUTING

RELATED APPLICATIONS

This application is a continuation of U.S. patent application Ser. No. 17/214,617, filed 26 Mar. 2021, which claims the benefit of U.S. Provisional Patent Application No. 63/133,081, filed 31 Dec. 2020 and U.S. Provisional Patent Application No. 63/085,927, filed 30 Sep. 2020; the entire content of each application is incorporated herein by reference.

TECHNICAL FIELD

This disclosure relates to computer networks and, more specifically, to segment routing for computer networks.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form.

Certain devices within the network, such as routers, use routing protocols to exchange and accumulate topology information that describes available routes through the network. This allows a router to construct its own routing topology map of the network. Upon receiving an incoming data packet, the router examines information within the packet and forwards the packet in accordance with the accumulated topology information.

Many routing protocols fall within a protocol class referred to as Interior Gateway Protocol (IGP), in which flooding-based distribution mechanisms are used to announce topology information to routers within the network. These routing protocols typically rely on routing algorithms that require each of the routers to have synchronized routing topology information for a given domain, referred to as the IGP area or domain. The contents of a Link State Database (LSDB) or a Traffic Engineering Database (TED) maintained in accordance with a link state routing protocol have the scope of an IGP domain. IGP routing protocols typically require that all routers in the IGP routing domain store, within an internal LSDB or TED, all of the routing information that has been distributed according to the IGP protocol. In operation, each router typically maintains an internal LSDB and/or TED and scans the entire database at a defined interval to generate and output link state messages to synchronize the database to neighboring routers within the routing domain. In this way, link state is propagated across the entire routing domain and stored in full at each router within the domain.

Packet-based networks use label switching protocols for traffic engineering and other purposes. Multi-Protocol Label Switching (MPLS) is a mechanism used to engineer traffic patterns within Internet Protocol (IP) networks according to the routing information maintained by the routers in the networks. By utilizing MPLS protocols, such as the Label Distribution protocol (LDP), the Resource Reservation Protocol (RSVP) with Traffic Engineering extensions (RSVP-TE), or the Segment Routing (SR) extension, label switching routers can forward traffic along a particular path through a network to a destination device, i.e., a Label Switched Path (LSP), using labels prepended to the traffic. An LSP defines a distinct path through the network to carry MPLS packets from the source device to a destination device. Using a MPLS protocol, each router along an LSP allocates a label in association with the destination and propagates the label to the closest upstream router along the path. Routers along the path add (push), remove (pop) or swap the labels and perform other MPLS operations to forward the MPLS packets along the established path.

Routers may employ segment routing techniques to leverage the Source Packet Routing in Networking (SPRING) paradigm. With segment routing, a head-end network node can steer a packet flow along any path by augmenting the header of a packet with an ordered list of segment identifiers for implementing a segment routing policy. Segment routing can reduce, and in some cases eliminate, intermediate per-flow states that are inherent in conventional MPLS routing.

SUMMARY

In general, techniques are described for computing multipaths that realize a segment routing (SR) policy and satisfy a bandwidth constraint for an SR policy. Multiple paths computed and provisioned to implement an SR policy are referred to as multipaths, and these may enable equal-cost multipath (ECMP)-based load balancing of the SR policy across the multiple paths. As described, in some examples, the SR policy may specify a bandwidth constraint that the combined bandwidth of the paths of the multipath must satisfy.

To compute a multipath that realizes an SR policy and also satisfies a bandwidth constraint for the SR policy, a controller for an SR-domain may compute a first set of shortest paths as a potential multipath for the SR policy, based on a network topology model for the network. The controller may then compare the expected bandwidth use by each of the first set of shortest paths for traffic steered to the SR policy to the available bandwidths of links that make up the path. For each path, if an expected bandwidth use by a path for the SR policy exceeds an available bandwidth of a link on that path, the controller may modify the network topology model to add a bandwidth overflow metric to the link. The controller may then compute a second set of shortest paths as a different potential multipath for the SR policy, based on the modified network topology model that includes any added bandwidth overflow metrics. The controller may again do a comparison to the expected bandwidth usages by each of the paths in the second set of shortest paths, and iterate in this way until a solution is found that does not overflow the bandwidths of any of the shortest paths for a new computed set of shortest paths.

The techniques may provide one or more technical advantages that realize at least one practical application. For example, the techniques may allow an SR-enabled network to support bandwidth-constrained multipath SR path computation, which may reduce overloaded paths and corresponding packet drops on such multipaths provisioned in the network.

In an example, this disclosure describes a method comprising: computing, by a computing device, for a segment routing policy that specifies a bandwidth constraint for the segment routing policy, first shortest paths through a network of network nodes, wherein each shortest path of the first shortest paths represents a different sequence of links connecting pairs of the network nodes from a source to a destination; in response to determining, by the computing device based on the bandwidth constraint for the segment routing policy, a link of one of the first shortest paths has insufficient bandwidth to meet a required bandwidth for the link, increasing a metric of the link; computing, by the computing device, for the segment routing policy that specifies the bandwidth constraint for the segment routing policy, based on the increased metric of the link, second shortest paths through the network of network nodes; and provisioning the second shortest paths in the network of nodes.

In an example, this disclosure describes a computing device comprising a memory; and processing circuitry in communication with the memory, the processing circuitry and memory being configured to: compute, for a segment routing policy that specifies a bandwidth constraint for the segment routing policy, first shortest paths through a network of network nodes, wherein each shortest path of the first shortest paths represents a different sequence of links connecting pairs of the network nodes from a source to a destination; in response to determining, based on the bandwidth constraint for the segment routing policy, a link of one of the first shortest paths has insufficient bandwidth to meet a required bandwidth for the link, increase a metric of the link; compute for the segment routing policy that specifies the bandwidth constraint for the segment routing policy, based on the increased metric of the link, second shortest paths through the network of network nodes; and provision the second shortest paths in the network of nodes.

In an example, this disclosure describes a non-transitory computer-readable storage medium encoded with instructions that, when executed, cause one or more processors of a computing device to perform operations comprising: computing, for a segment routing policy that specifies a bandwidth constraint for the segment routing policy, first shortest paths through a network of network nodes, wherein each shortest path of the first shortest paths represents a different sequence of links connecting pairs of the network nodes from a source to a destination; in response to determining, based on the bandwidth constraint for the segment routing policy, a link of one of the first shortest paths has insufficient bandwidth to meet a required bandwidth for the link, increasing a metric of the link; computing, for the segment routing policy that specifies the bandwidth constraint for the segment routing policy, based on the increased metric of the link, second shortest paths through the network of network nodes; and provisioning the second shortest paths in the network of nodes.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Segment routing (SR), which may also be referred to as source packet routing or source packet routing in networking (SPRING), is a control-plane architecture that enables an ingress router to steer a packet through a specific set of network nodes and links in a network without relying on intermediate network nodes in the network to determine the path it should take. Fundamental to SPRING forwarding is the notion of Segment Identifiers (SIDs). Segment routing and SIDs are described in further detail in Filsfils & Previdi, ed., "Segment Routing Architecture," Internet Engineering Task Force (IETF) RFC 8402, July 2018; Sivabalan, ed., "Segment Routing Policy Architecture," SPRING Working Group, ver. 09, Nov. 1, 2020; and Talaulikar, ed., "SR Policy Implementation and Deployment Considerations," SPRING Working Group, ver. 04, Oct. 9, 2019; the entire contents of each of which are incorporated herein by reference. "Segment Routing Policy Architecture" defines an SR Policy as "a framework that enables instantiation of an ordered list of segments on a node for implementing a source routing policy with a specific intent for traffic steering from that node."

Figure 1:
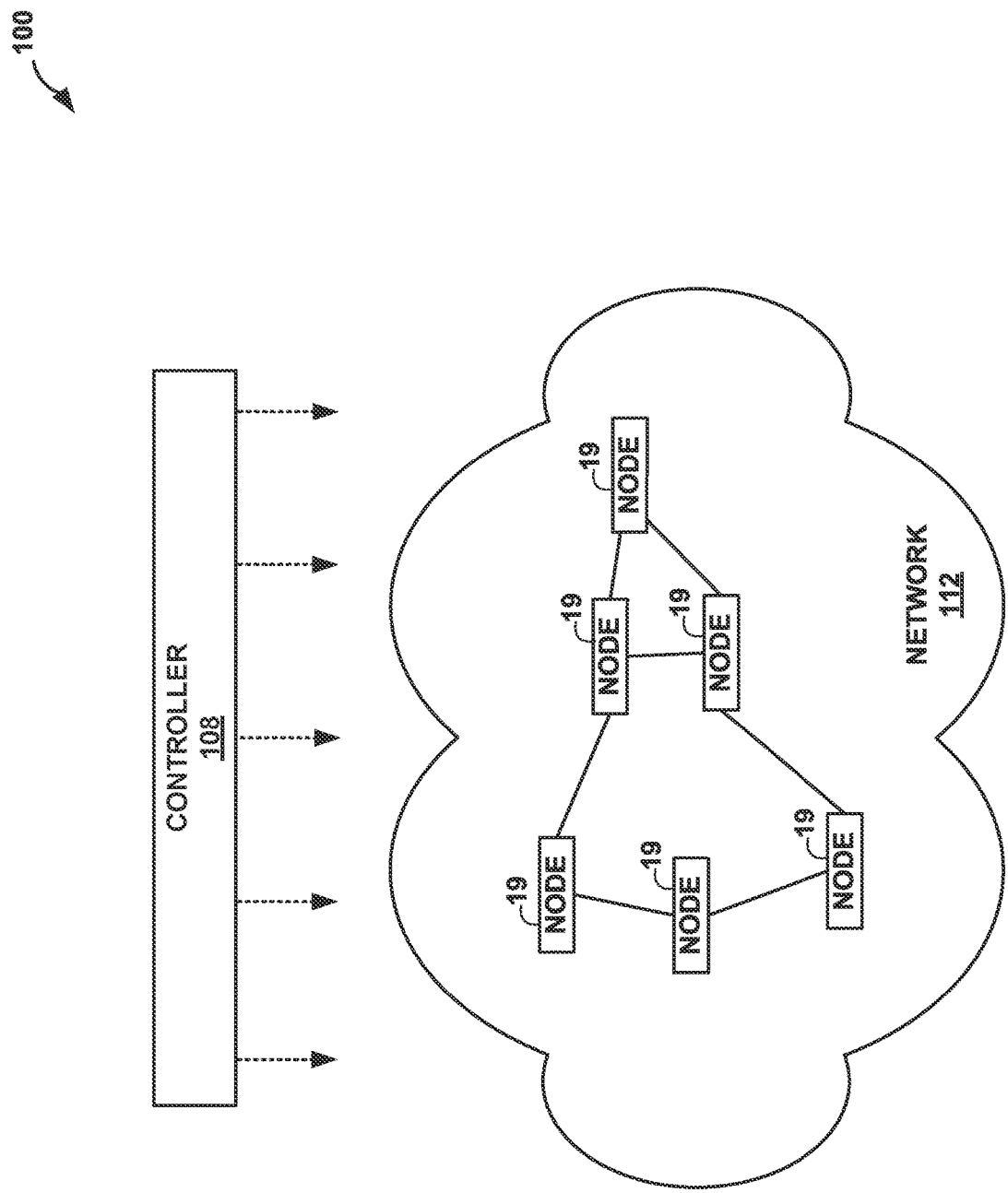
FIG. 1 is a block diagram illustrating an example system, having a network and a controller, and configured to operate in accordance with techniques described in this disclosure.

FIG. 1 is a block diagram illustrating an example system 100 having network 112 and controller 108 configured to operate in accordance with techniques described in this disclosure. Network 112 one or more computer networks (e.g., a set of interconnected L2/L3 networks) and, in some examples, may be a wide area network. Network 112 may include or more autonomous systems, data centers, branch offices, private network, public networks, cloud networks, or other types of networks.

Network 112 includes network nodes 19 that are SR-enabled and constitute an SR-domain. Network nodes 19 may be alternatively referred to as "SR nodes." The SR-domain may include any number of network nodes 19. Each of network nodes 19 may represent a router, a switch, or other network device that is capable of performing segment routing. Network 112 may include many other network devices that are not part of an SR-domain or otherwise not SR-enabled, such as other routers or switches.

Using segment routing, network nodes 19 forward network packets of packet flows from sources to destinations along segment routing paths that are encoded as lists of segment identifiers that augment network packet headers and are used by network nodes 19 for identifying the next segment to forward each network packet. Sources of network packets received and forwarded by network nodes 19 may include one or more devices (not shown) and/or any public or private network or the Internet. The destinations of the network packets being forwarded by network nodes 19 may include one or more destination devices and/or network that may include LANs or wide area networks (WANs) that include a plurality of devices. For example, destination devices may include personal computers, laptops, workstations, personal digital assistants (PDAs), wireless devices, network-ready appliances, file servers, print servers or other devices that receive network packets from sources.

Segment routing has multiple types of segments. These include prefix segments that represent the shortest path (e.g., according to IGP metrics) between any of network nodes 19 and a specified prefix. Prefix segments include node segments, where the specified prefix identifies a particular network node 19 (e.g., the loopback address of the particular network node 19), and anycast segments, which enforced the Equal Cost Multipath (ECMP)-aware shortest path forwarding towards the closest network node 19 of an anycast group. An anycast group includes one or more network nodes 19, and the specified prefix can be advertised by any of the network nodes 19 in the anycast group. A segment may be referred to by its Segment Identifier (SID).

Other segment types include adjacency segments, which are IGP adjacencies between network nodes 19, binding segments, and adjacency sets. A binding segment may represent a tunnel through network nodes 19. The tunnel may include a SR policy. An SR Policy may itself implement or be implemented in network 112 using a multipath. An adjacency set represents multiple adjacencies and the same SID is used for the multiple adjacencies. This is the adjacency parallel version of anycast SID, where the same SID indicates for multiple nodes in the network. In general, SIDs that can be used to steer traffic simultaneously to multiple paths that give rise to preferable SID reduction or minimization solutions. Adjacency sets and anycast SIDs are important such SIDs.

In some examples, network nodes 19 apply segment routing using a Multi-protocol Label Switching (MPLS) architecture. In such examples, each segment is encoded as an MPLS label and an SR Policy may be instantiated as a label stack appended to network packets. The active segment is on the top of the label stack. Upon completion of a segment, a network node 19 pops the corresponding label from the label stack.

In some examples, network nodes 19 apply segment routing using an IPv6 architecture and the SR Header (SRH). In such examples, an instruction may be associated with a segment and encoded as an IPv6 address that maps to a SID. An SR Policy is instantiated as an ordered list of SIDs in the routing header. The Destination Address (DA) of the packet indicates the active segment. The SegmentsLeft (SL) pointer in the SRH indicates the next active segment. When a network node 19 completes a segment, the network node decrements the SL pointer and copies the next segment to the destination address. A network packet is steered on an SR Policy is augmented with the corresponding SRH for the SR Policy.

In some examples, network nodes 19 may operate as label switching routers (LSRs) to distribute labels to neighboring LSRs within network 112. For example, there may be multiple different label types including "adjacency" labels and "node" labels. Such labels may be or otherwise correspond to segment identifiers that locally or globally identify a segment in network 112. To forward a packet through network 112, network nodes 19 may push, pop, or swap one or more labels in a list of segment identifiers that is applied to the packet as it is forwarded through the network. The label stack may encode the topological and service source route of the packet under the SR policy.

An adjacency label may have a local semantic to a particular segment routing node, such as one of network nodes 19. In particular, an adjacency label steers traffic onto an adjacency (e.g., communication link and/or interface) or set of adjacencies. Thus, an adjacency label may be related to a particular network node 19. To use an adjacency label, a particular network node 19 may initially assign the adjacency label to a particular adjacency and advertise the adjacency label to other routers in the segment routing domain using an IGP, such as Intermediate System—Intermediate System (ISIS) or Open Shortest Path First (OSPF). The particular network node 19 may be the only network node in the SR domain to use the particular adjacency label. When a network node 19 forwards a packet using the adjacency label, the network node 19 may cause the packet to use the adjacency for the particular network node 19 associated with the adjacency label. In this way, adjacency labels may be used to establish one-hop tunnels for segments.

A node label, by contrast, may have a global semantic within the SR domain. That is, each of network node 19 may be assigned a defined node label range (commonly referred to as Segment Routing Global Block (SRGB)) that is unique to each network node 19 within the SR domain. An operator of network 112 may ensure unique allocation of the different node label ranges from a global range to different network nodes 19. In addition to a node label range, each particular network node 19 may also have a specific node identifier that uniquely identifies the particular network node 19 in the SR domain. Each network node 19 may advertise its corresponding node identifier and node label range to other network nodes 19 in the SR domain using, e.g., an IGP.

Based on routes determined using, e.g., shortest path routing, each of network node 19 may configure its forwarding state to implement SR using MPLS or using an IPv6 architecture and the SR Header (SRH), as described above. Using MPLS for instance, each of network nodes 19 may perform path selection using topology information learned by way of IGP to compute a shortest path within network 112 on a hop-by-hop basis based on the routing information maintained by the network nodes 19. Each of network nodes 19 may then select a next hop along the locally computed shortest path and install forwarding information associated with the selected next hop in a forwarding plane of the network node, wherein the forwarding information identifies a network interface to be used when forwarding traffic and one or more labels to be applied when forwarding the traffic out the interface. The network nodes 19 use the next hops with the assigned labels to forward traffic hop-by-hop.

System 100 may implement segment routing using distributed or centralized control. With distributed control, network nodes 19 allocate and signal segments using routing protocols, such as IS-IS or OSPF or Border Gateway Protocol (BGP). A network node 19 individually decides to steer packets on an SR Policy that is implemented using one or more candidate paths. The network node 19 individually computes the SR Policy. With distributed control, controller 108 may not be part of system 100. In the distributed control scenario, network nodes 19 are computing devices that may compute one or more lists of SIDs that satisfy each path of a plurality of paths for implementing an SR policy. In general, a path represents a different sequence of links connecting pairs of the network nodes from a source to a destination. A multipath is a plurality of such paths. Different paths of a multipath may share links.

With centralized control, controller 108 allocates and signals segments. Controller 108 decides the network nodes 19 on which to steer packets mapped to SR policies. Controller 108 applies path computation to compute candidate paths for satisfying SR policies. In addition, controller 108 programs network 112, in particular network nodes 19, with forwarding information for implementing the candidate paths using lists of SIDs. Controller 108 may program network nodes 19 using Network Configuration Protocol (NETCONF), Path Computation Element Communication Protocol (PCEP), BGP, or other protocols. Controller 108 may represent one or more SR controllers and may be a WAN controller that is manages not just the SR domain but path computation, traffic engineering, provisioning, and other network control tasks for an operator of network 112. Controller 108 may include or represent a path computation element and may be alternatively referred to as a PCE controller or SDN controller. Controller 108 may discover the SIDs instantiated at the various network nodes 19 and discover the sets of local (SRLB) and global (SRGB) labels that are available at the various network nodes 19. Controller 108 may listen for other topology information using routing protocols. In the centralized control scenario, controller 108 is a computing device that may compute one or more lists of SIDs that satisfy each path of a plurality of paths (referred to as "multipath") for implementing an SR policy. Each of the paths is from a source for the multipath to a destination for the multipath. Controller 108 may compute the multipath from one or more sources to one or more destinations in order to realize the SR policy. Having computed the one or more lists of SIDs, controller 108 may then program network 112 to forward network traffic based at least on the one or more lists of SIDs.

Although the techniques of this disclosure are described primarily with respect to operations performed by controller 108 applying centralized control, the techniques are similarly applicable to a distributed control model in which network nodes 19 allocate and signal segments and perform other operations described herein with respect to controller 108. Both controller 108 and network nodes 19 may be alternatively referred to as control devices or computing devices.

One or more lists of SIDs satisfy each path of a plurality of paths for implementing an SR policy when traffic forwarded by the network nodes 19 using a list of SIDs, from the one or more lists of SIDs, is forwarded along one of the paths and is not forwarded on a path that is not one of the paths. Moreover, the one or more lists of SIDs are satisfactory when they make complete use of the plurality of paths, i.e., network nodes 19 can forward traffic along any of the paths using the one or more lists of SIDs. For example, a first list of SIDs may cause a network packet steered to the SR policy to traverse a first path of the plurality of paths, while a second list of SIDs may cause a network packet steered to the SR policy to traverse a second path of the plurality of paths, or a single list of SIDs may cause a network packet steered to the SR policy to traverse both a first path and a second path of the plurality of paths. The network nodes can use weighted or non-weighted equal-cost multipath (ECMP) to forward traffic to a next segment and/or to select one of the one or more lists of SIDs.

In accordance with techniques of this disclosure, controller 108 computes multipaths that realize a segment routing (SR) policy and satisfy a bandwidth constraint for the SR policy. An operator, script, network management system (NMS), policy controller or other system may configure controller 108 with an SR policy that, in addition to source(s), destination(s), and other SR policy properties, specifies a bandwidth constraint. As one example, the bandwidth constraint may be specified using a bandwidth amount value, e.g., 100G, and may be specified in a manner that requires the total bandwidth for the selected multipaths to satisfy in combination.

For example, the bandwidth constraint may be specified as a path computation constraint that the combined bandwidth of paths of any computed multipath for the SR policy must satisfy. Because nodes 19 may load balance traffic, steered to the SR policy, evenly across multiple paths of a multipath for the SR policy, the bandwidth amount that is required from each path of the multipath to satisfy the path computation bandwidth constraint is a ratio of the path computation bandwidth constraint to the number of paths. For example, if a computed multipath has N paths and the path computation bandwidth constraint is M Gbps (sometimes abbreviated G, e.g., 100G), the each of the N paths must have sufficient available bandwidth to support (M/N) Gbps. The above example assumes that the paths are independent, i.e., do not share any links. Different paths of the N paths may share links, however, and a network node may have several paths converging and diverging on it.

To compute a multipath that realizes the SR policy and satisfies the bandwidth constraint for the SR policy, controller 108 for SR-enabled network 112 may compute first shortest paths as a potential multipath for the SR policy, based on a network topology model for network 112 obtained by controller 108. "Shortest paths" refers to a set of one or more shortest paths. Controller 108 may then compare the expected bandwidth use by each of the first set of shortest paths for traffic steered to the SR policy to the available bandwidths of links that make up the path. For each path, if an expected bandwidth use by a path for the SR policy exceeds an available bandwidth of a link on that path, controller 108 may modify the network topology model to add a bandwidth overflow metric to the link. Controller 108 may then compute a second set of shortest paths as a different potential multipath for the SR policy, based on the modified network topology model that includes any added bandwidth overflow metrics. Controller 108 may again do a comparison to the expected bandwidth usages by each of the paths in the second set of shortest paths, and iterate in this way until a solution is found that does not overflow the bandwidths of any of the computed shortest paths.

Figure 2A:
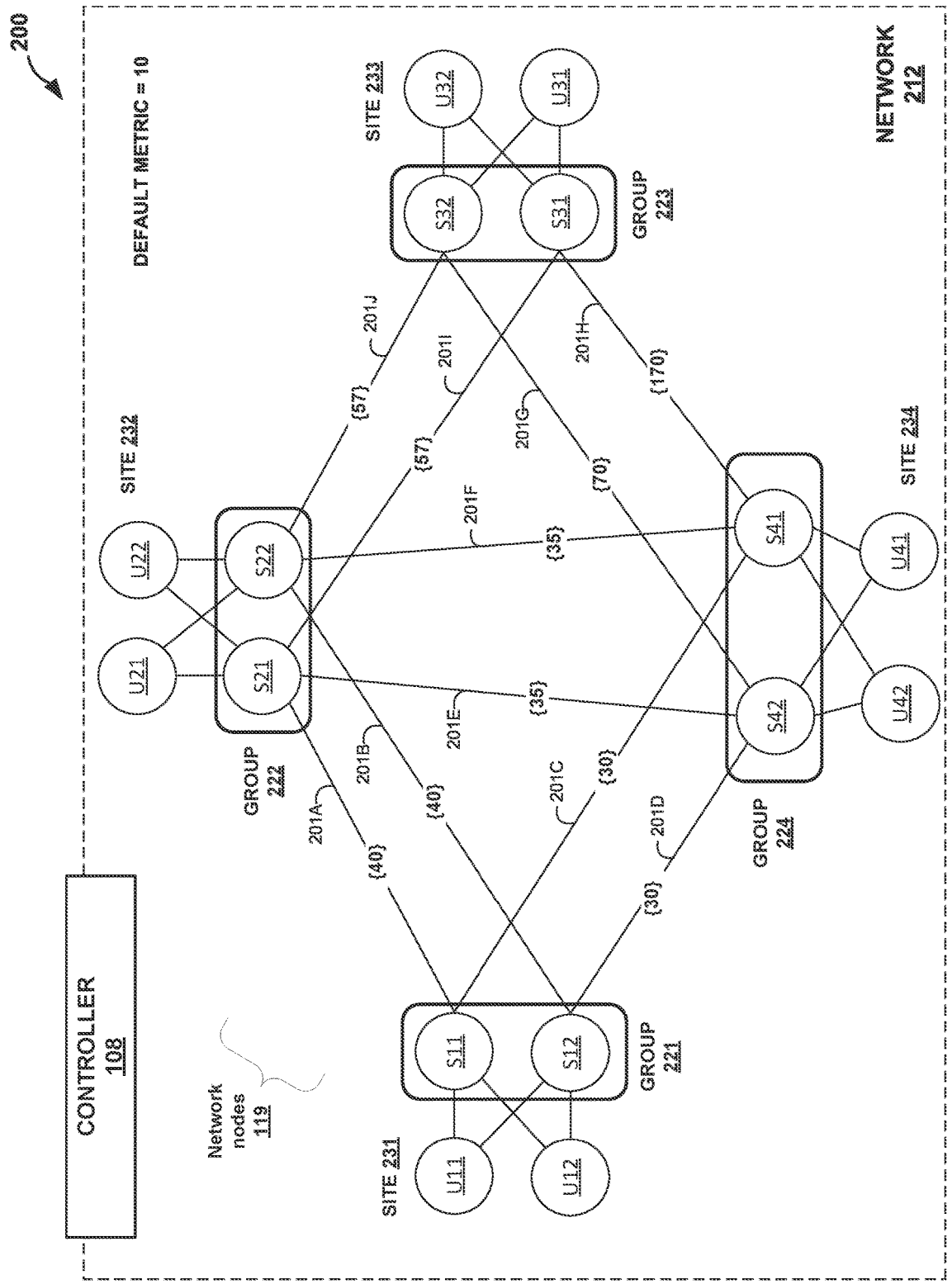
FIGS. 2A-2B are block diagrams illustrating an example system, having a network and a controller, and configured to operate in accordance with techniques described in this disclosure.
Figure 2B:
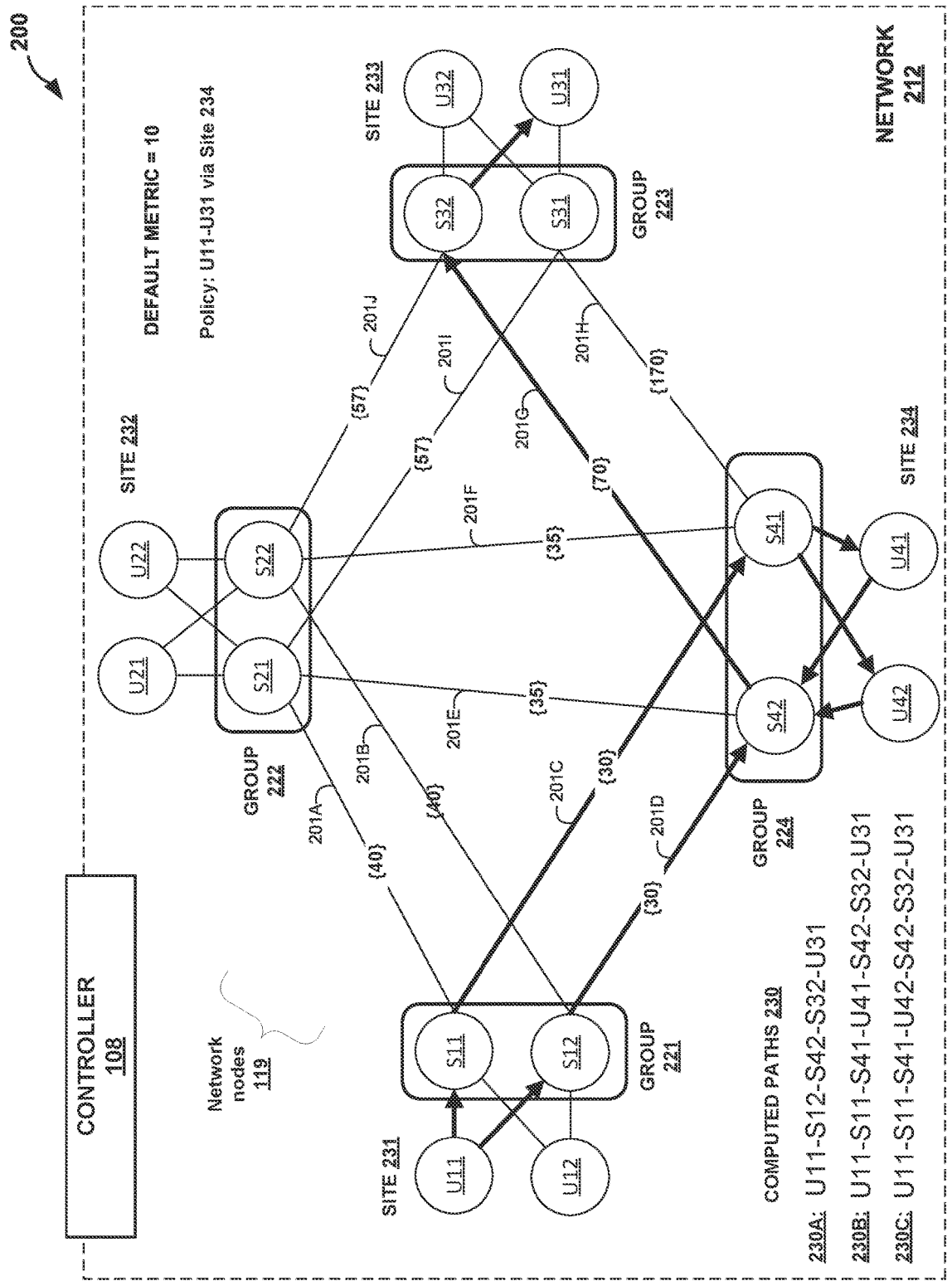

FIGS. 2A-2B are block diagrams illustrating an example system 100 having network 112 and controller 108 configured to operate in accordance with techniques described in this disclosure. Controller 108 and network 212 may be examples of controller 108 and network 112 of FIG. 1, respectively.

Network 212 includes network nodes U11, U12, U21, U22, U31, U32, U41, U42, S11, S12, S21, S22, S31, S32, S41, and S42 (collectively, "network nodes 119"). Network nodes 119 are located in different sites 231-234. For example, network nodes S41, S42, U41, and U42 are located in site 234, network nodes U31, U32, S31, and S32 are located in site 233.

Some of network nodes 119 are members of anycast groups. Anycast group 221 includes network nodes S11 and S12. Anycast group 222 includes network nodes S21 and S22. Anycast group 223 includes network nodes S31 and S32. Anycast group 224 includes network nodes S41 and S42.

Network nodes 119 are connected in a network topology with links 201A-201J (collectively, "links 201"). Each link of links 201 has an associated metric, e.g., an IGP metric, representing a cost to traverse the link for a shortest path first algorithm. The metric for a link is illustrated in FIGS. 2A-2B using braces "{M}", where the value of M is the metric. For example, link 201H connecting S41 to S31 has a metric of 170. As illustrated, the default metric for a link in network 212 is 10. For example, the unnamed links connecting U11 to S11 and U11 to S12 have metrics of 10.

FIG. 2B illustrates a multipath from source U11 to destination U31 for implementing SR Policy "U11-U31 via Site 234". The multipath includes multiple possible computed paths that may be taken by network packets from U11 to U31 to satisfy the SR policy. Controller 108 or one of network nodes 119 may compute the computed paths 230, which include paths 230A-230C. Path 230A, for instance, traverses network nodes U11 to S12 to S42 to S32 to U31 and the links connecting these pairs of network nodes, e.g., the U11-S12 link, the S12-S42 link 201D, and so forth. The paths are illustrated in FIG. 2B as superimposed on the network 112 using bold arrows. Computed paths 230 are not the shortest paths from U11 to U31, instead traversing network nodes of Site 234 in order to satisfy the SR Policy.

FIGS. 3A-3H are block diagrams illustrating a process for computing lists of segment identifiers (SIDs) that satisfy each of paths 230 of FIGS. 2A-2B in the multipath solution for a segment routing (SR) policy. When attached to a packet steered to the SR policy by U11, for instance, a list of SIDs will cause network 212 to forward the packet on the multipath and prevent network 212 from forwarding the packet on a path that is not a path of the multipath, i.e., not one of paths 230. In some examples, the techniques may include determining, based on routing (e.g., IGP) metrics, respective distances for network nodes 119 from source network node U11 for the multipath and identifying candidate sets (or "candidate combinations") of one or more network nodes 119 or adjacencies to be used as bases for SIDs to extend candidate lists of SIDs in progress. In some cases, the techniques include computing an equidistant metric graph rooted at the source network node U11 based on the metrics. Identifying candidate sets of one or more network nodes or adjacencies may include identifying one or more network nodes 119 that all of the multipaths traverse and that would not be bypassed, e.g., routed around, by shortest paths from earlier network nodes 119 to subsequent network nodes 119 in the multipath. Identifying candidate sets of one or more network nodes or adjacencies may include identifying two or more network nodes 119 that are equidistant from the source and are not bypassed, collectively, by shortest paths from earlier network nodes 119 to subsequent network nodes 119 in the multipath. SIDs generated from the identified candidate sets of network nodes may include anycast SIDs and node SIDs. The techniques may iteratively build up the candidate lists of SIDs by extending candidate lists of SIDs in progress with SIDs generated from newly identified candidate sets of one or more network nodes or adjacencies, and rooting further equidistant metric graphs from network nodes of the candidate sets of one or more network nodes or adjacencies. The techniques may be applied by controller 108 or by any of network nodes 119 but are described hereinafter primarily with respect to controller 108.

Figure 3A:
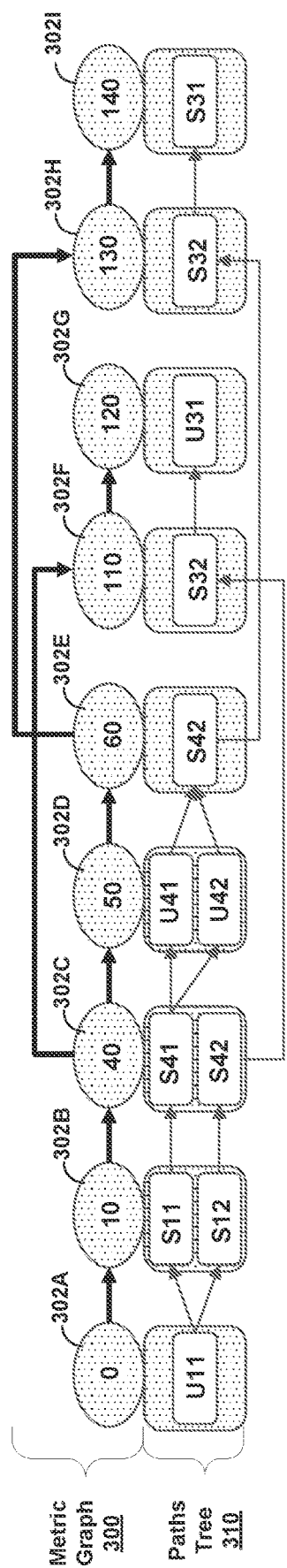
FIGS. 3A-3H are block diagrams illustrating a process for computing lists of segment identifiers (SIDs) that satisfy each of the paths in multipath solution for a segment routing (SR) policy.

FIG. 3A illustrates an equidistant metric graph (MG) 300 rooted at source network node U11 and shown alongside a paths tree 310 representing the multipath of paths 230. Controller 108 computes MG 300 based on the paths 230 and the metrics for links of the paths 230. Controller 108 may use a shortest path first algorithm, such as Dijkstra, to compute MG 300. MG 300 includes metric graph nodes 302A-302I (collectively, "MG nodes 302") and directed edges representing the links for the paths tree. For example, MG 300 includes a directed edge from MG node 302A to 302B. Each MG node of the MG nodes 302 represents at least one network node, of the one or more network nodes 119, that are a same distance from the source network node U11 along at least one path, of the plurality of paths 230, based on the metrics for the links represented in the plurality of paths 230. FIG. 3A illustrates represented network nodes for any of MG nodes 302 using a vertical alignment. For example, network node U11 is represented by MG node 302A, network nodes S11 and S12 are represented by MG node 302B, and so forth. As used herein, network nodes may be described alternatively as "represented by" or "in" metric graph nodes for a metric graph.

Network nodes 119 represented by an MG node 302 are equidistant from network nodes 119 represented by preceding and subsequent MG nodes 302 in the directed MG 300. For example, S41 and S42 are both equidistant (by metric value 30) from S11 and S12 represented by MG node 302C, equidistant (by metric value 70) from S32 represented by MG node 302F, and equidistant (by metric value 90) from S32 also represented by MG node 302H. S32 is represented by multiple MG nodes 302 because it is traversed by multiple paths 230 and has different distances from the source on these multiple paths. When computed, each of MG nodes 302 may be, by default, a candidate MG node for extending one or more lists of SIDs.

Because they are equidistant from the source node, the multipath nodes in an MG node provide candidate node and anycast SIDs for candidate lists of SIDs. MG nodes 302 that have a link going around them in the order are called bypassed. Bypassed MG nodes 302 do not give rise to node or anycast SID candidates because traffic needs to flow around them.

Figure 3B:
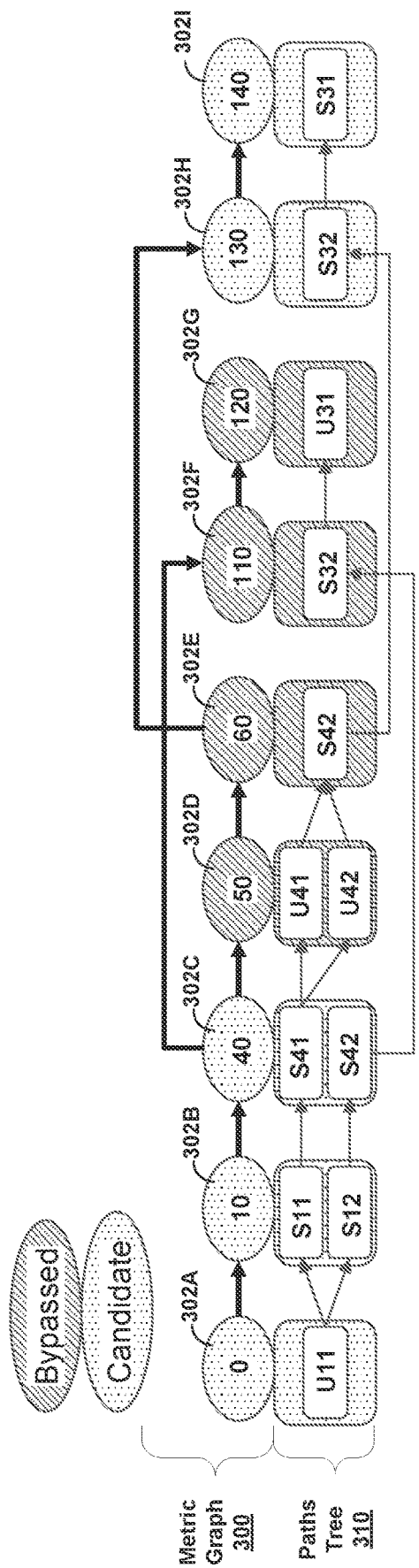
Figure 3C:
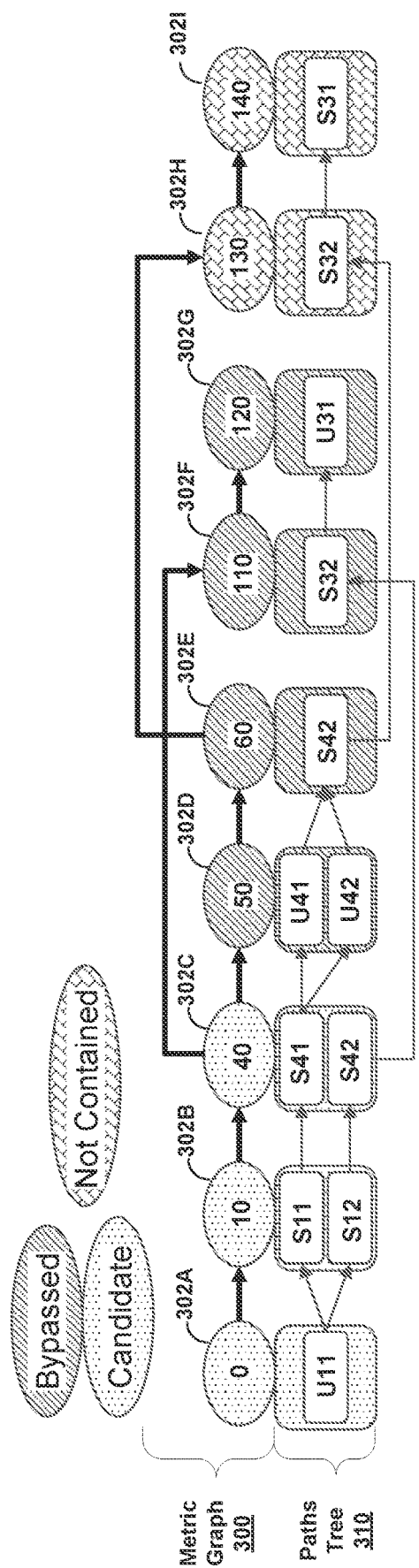

FIG. 3B illustrates MG 300 with some MG nodes 302 indicated as bypassed because traffic needs to flow around them. MG Node 302D representing network nodes U41 and U42, for example, is marked as bypassed because path 230A does not include U41 or U42 and traffic on path 230A thus flows around U41 and U42. MG nodes 302E, 302F, and 302G are also marked as bypassed. MG 300 indicates bypassed nodes with the directed edges. The directed edge from MG node 302C to MG node 302F bypasses MG nodes 302D and 302E. MG nodes 302D and 302E are therefore marked as bypassed. Controller 108 can thus identify bypassed MG nodes 302 by traversing MG 300 and identifying MG nodes that have a directed edge going around them.

Another way to understand bypassed nodes is to consider what S42 would do if it received a packet with a node SID for U41 or U42 on top of the SID stack. S42 would send the traffic out on the links S42→U41 and S42→U42, respectively. And those links in those directions are not links on the paths for the multipath to keep the traffic on. Thus, looking at bypassed MG nodes in the MG becomes an efficient way to eliminate candidates without having to do a full ECMP shortest path calculation between all pairs of network nodes where one is in a bypassed MG node and the other network node is in some other MG node.

By analyzing the shortest multipaths from the represented network nodes of the source MG node 302A to the represented nodes in a non-bypassed MG node 302, more candidates can be eliminated. If such shortest multipaths aren't contained in the multipath solution (here, paths 230), then those MG nodes 302 are not candidates. This eliminates MG node 302H and 302I from the candidate list because the shortest paths from U11 to S32 or S31 traverse network nodes S21 and S22, and these paths are not any of paths 230 (the multipath).

Figure 3D:
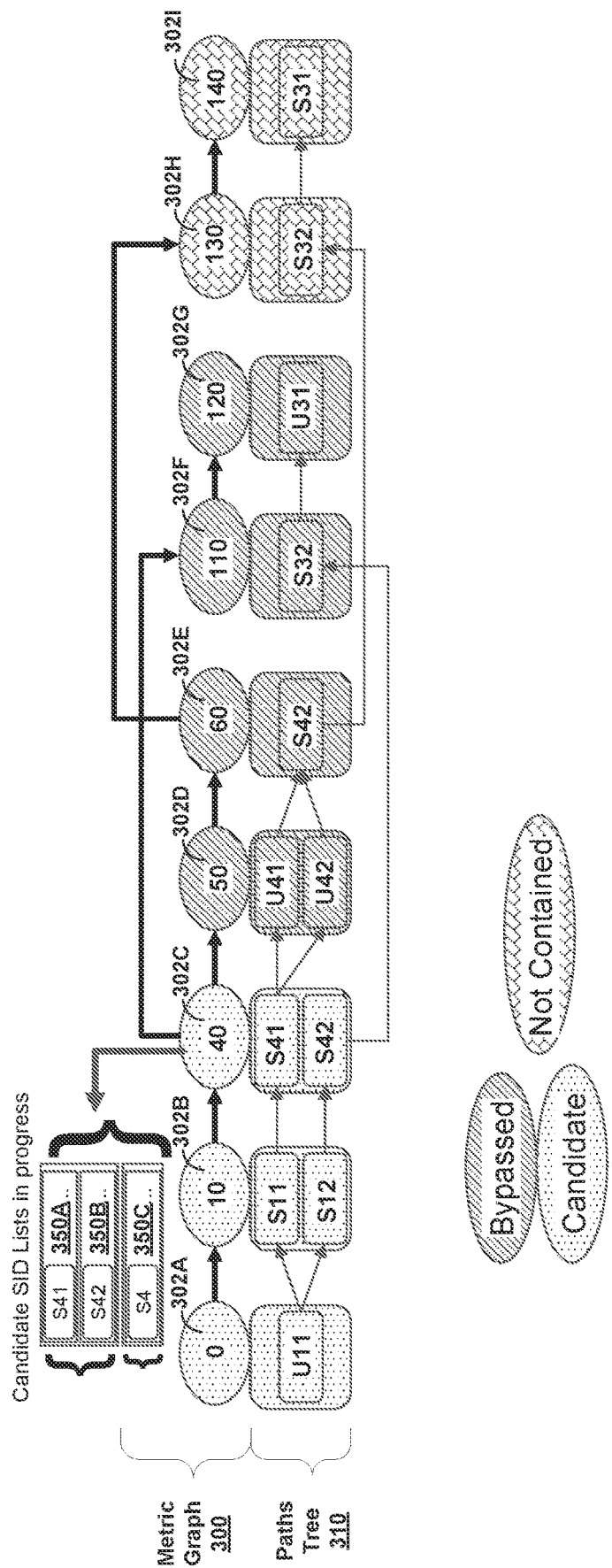

FIG. 3D illustrates a step in the iterative generation of candidate lists of SIDs. Having eliminated MG nodes 302D-302I from consideration, controller 108 may apply a greedy heuristic in this case to select the remaining MG node 302C that is furthest by distance from MG source node 302A. MG node 302C represents anycast group 224 (having identifier "S4" in this example) that includes network nodes S41 and S42. Each of these correspond to candidate SIDs for candidate lists of SIDs in progress. Because the in progress list was empty, controller 108 creates two candidate lists of SIDs in progress, one made up of lists 350A-350B and one being list 350C, controller 108 adds respective S41 (the node SID thereof), S42 (the node SID thereof), and S4 (the anycast SID for group 224) segments to these. By reference to FIG. 2B, it can be seen that that traffic forwarded according any of the candidate lists of SIDs in progress 350A-350C will reach anycast group 224 and encompasses all paths within the multipath that reach anycast group 224.

Figure 3E:
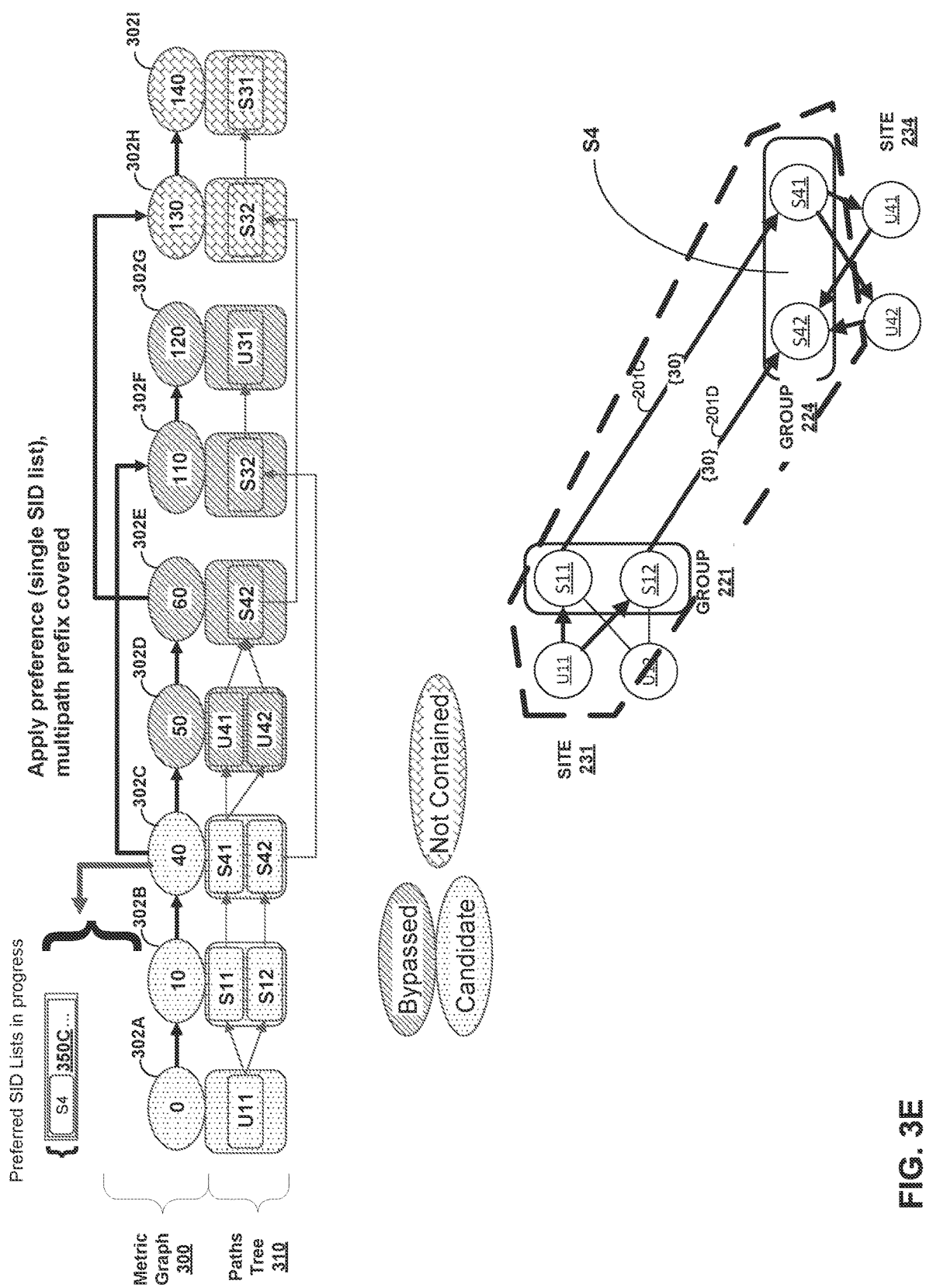

FIG. 3E illustrates application of a further heuristic whereby, because all of the network nodes in anycast group 224 are represented by MG node 302C along with anycast group 224, i.e., there are no other network nodes 119 outside of anycast group 224, controller 108 applies a preference for the anycast SID for anycast group 224. Controller 108 may therefore discard lists 350A and 350B in favor of the preferred list 350C.

FIG. 3E illustrates application of a further heuristic whereby, because all of the network nodes in anycast group 224 are represented by MG node 302C along with anycast group 224, i.e., there are no other network nodes 119 outside of anycast group 224, controller 108 applies a preference for the anycast SID for anycast group 224. Controller 108 therefore discards lists 350A and 350B.

Although MG nodes 302B and 302C both give rise to candidates for the start of the minimum SID lists in progress, the optional preference applied is for the fewest SIDs in the SID lists. MG node 302C therefore gives rise to better candidates than MG 302B because it covers more of the multipath. One candidate start to the SID lists is to have one starting with node SID for S41 and another node SID for S42. Since S41 and S42 are in the same anycast group 224 with identifier S4, another candidate start to the SID lists is a single SID list starting with S4. This anycast option may only be a candidate when there are no other members of the anycast group occurring in MG nodes 302 closer to the source. If that were the case, these earlier members of the anycast group would capture the traffic and send it on paths outside the multipath. Thus, when a MG node 302 represents multiple network nodes of the one or more network nodes 119, controller 108 may generates a list of SIDs in progress to include an anycast SID for the at least one network node 119 represented by the MG node 302. Controller 108 exclude bypassed MG nodes. Controller 108 may exclude an MG node 302 that is "not containing", that is, that do not include the shortest paths from the source network node to the nodes represented by the MG node 302.

FIG. 3E also illustrates a sub-network of network 212 showing just the initial aspects of the multipath for reaching S4 (group 224). All sub-paths for paths 230 are included. A sub-path of a path is any set of one or more connected links of the path.

Figure 3F:
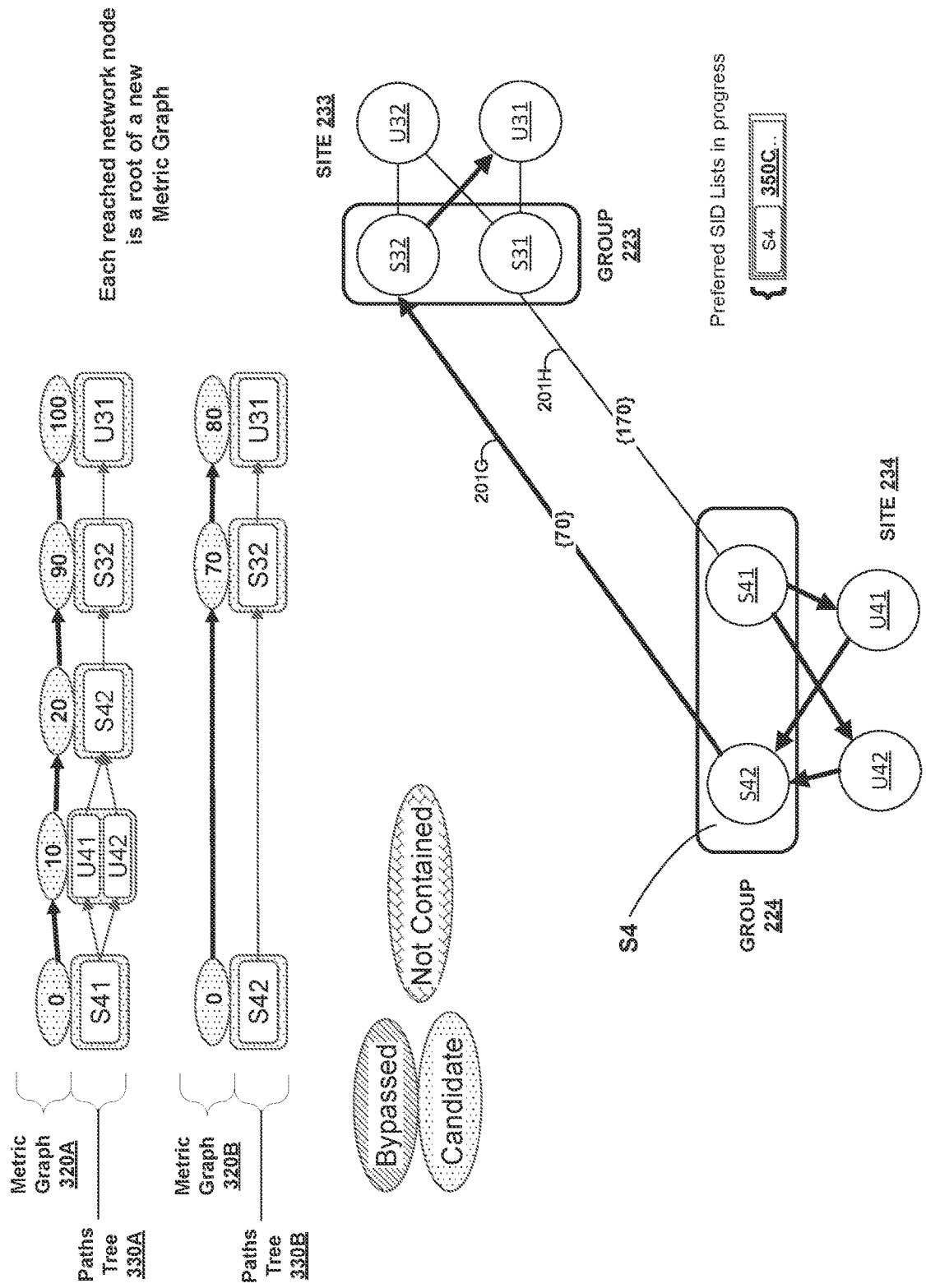

FIG. 3F illustrates a next iteration step in generating candidate lists of SIDs in progress. The remaining task is to compute an extension of the SID List(s) to cover the remaining multipath. To do this, the perspective of S41 and S42 is considered. Controller 108 reorganize the remainder of the MG 300 (or generates new MGs) from the remaining step into two MGs, one from S41 and one from S42. For list 350C still in progress, controller 108 computes new MGs for paths 230, this time rooted at each network node 119 in the anycast SID S4 (group 224). That is, each reached network node 119 is a root of a new MG. MG 320A is therefore rooted at S41, and MG 320B is therefore rooted at S42. All the MG nodes in both of these MGs 320A, 320B are candidates, none are bypassed, and all exactly contain the shortest multipaths between their represented network nodes 119.

Figure 3G:
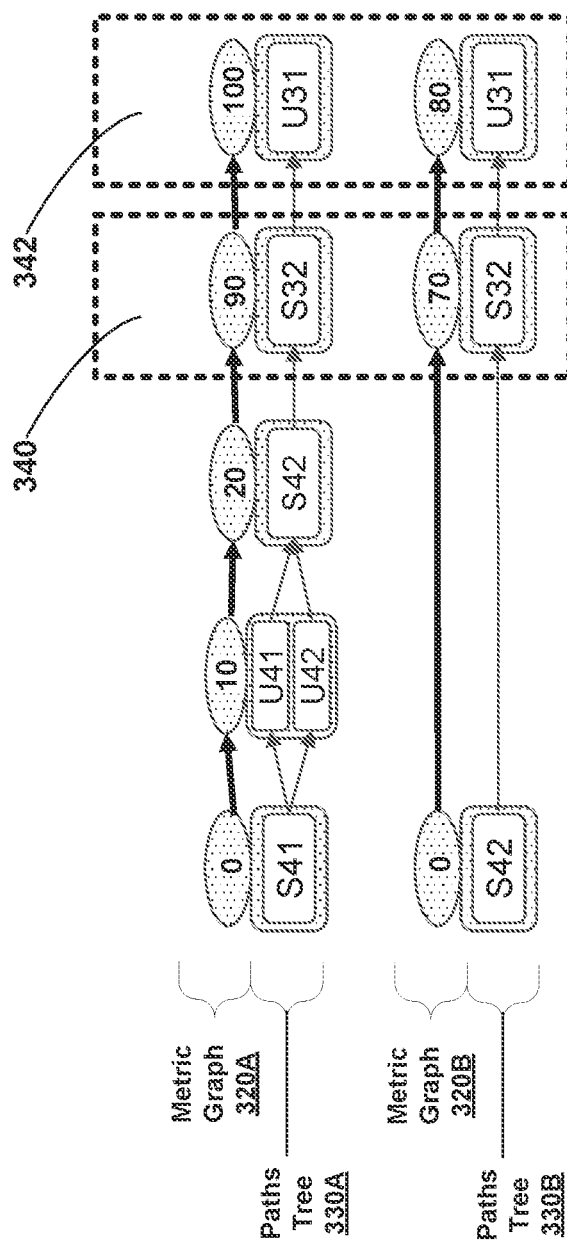
Figure 3H:
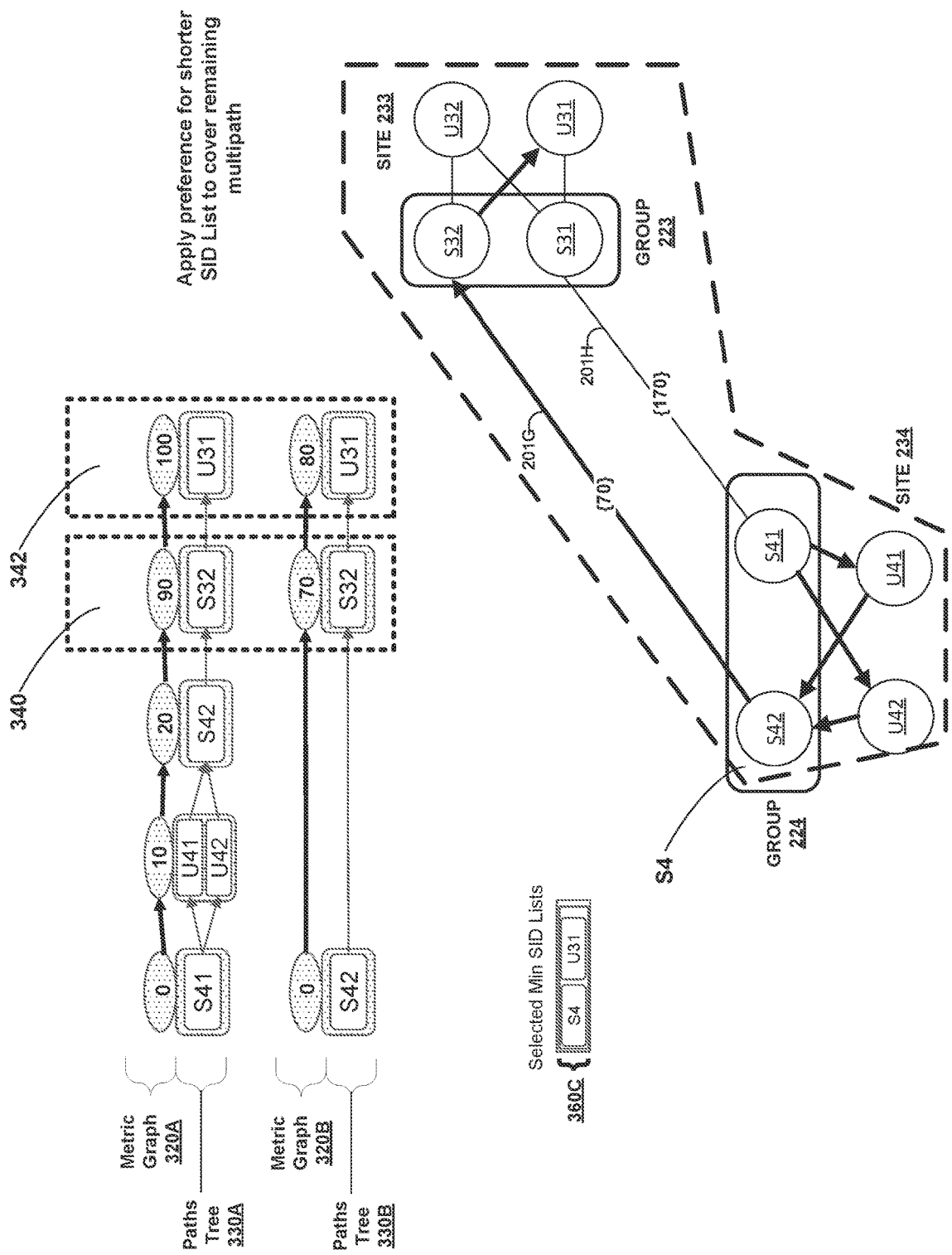

FIG. 3G illustrates compatible candidate combinations 340 and 342. When multiple nodes are reached by the SID list(s) in progress and there are multiple MGs, as with MGs 320A and 320B, controller may select compatible candidate combinations of MG nodes, one from each MG. The simplest kind of compatibility is a set of candidates that contain exactly the same network nodes. In this example, there are two such compatible combinations 340 and 342, as shown. This is a simple example, for each compatible combination there is a single same network node in each member of each compatible combination, S32 or U31. When this is the case, the SID list can be extended with a node SID to extend the SID list in progress. FIG. 3H illustrates application of the greedy heuristic in which controller 108 chooses the compatible MG nodes further by distance from the source MG nodes of MGs 320A, 320B, that is, the respective MG nodes of MGs 320A, 320B that represent U31.

Anycast groups enable more elaborate compatible combinations. If all network nodes in a combination are in the same anycast group and no member of the anycast group occurs in the sub-multipath that will be covered by the extension of the SID list in progress, controller 108 can use the anycast SID to extend the SID list in progress.

The second more elaborate case is a combination where each MG node contains the same set of network nodes. In this case, we can extend the SID lists in progress by duplicating them and extending them with the node SID of each node in the set.

FIG. 3H also shows a subnetwork of network 212 illustrating that the segment for U31 will reach extend all paths of the multipath to U31. Because U31 is the destination, this completes the multipath and, therefore, the updated SID list in progress 360C updated from 350C with the SID for U31.

Figure 4A:
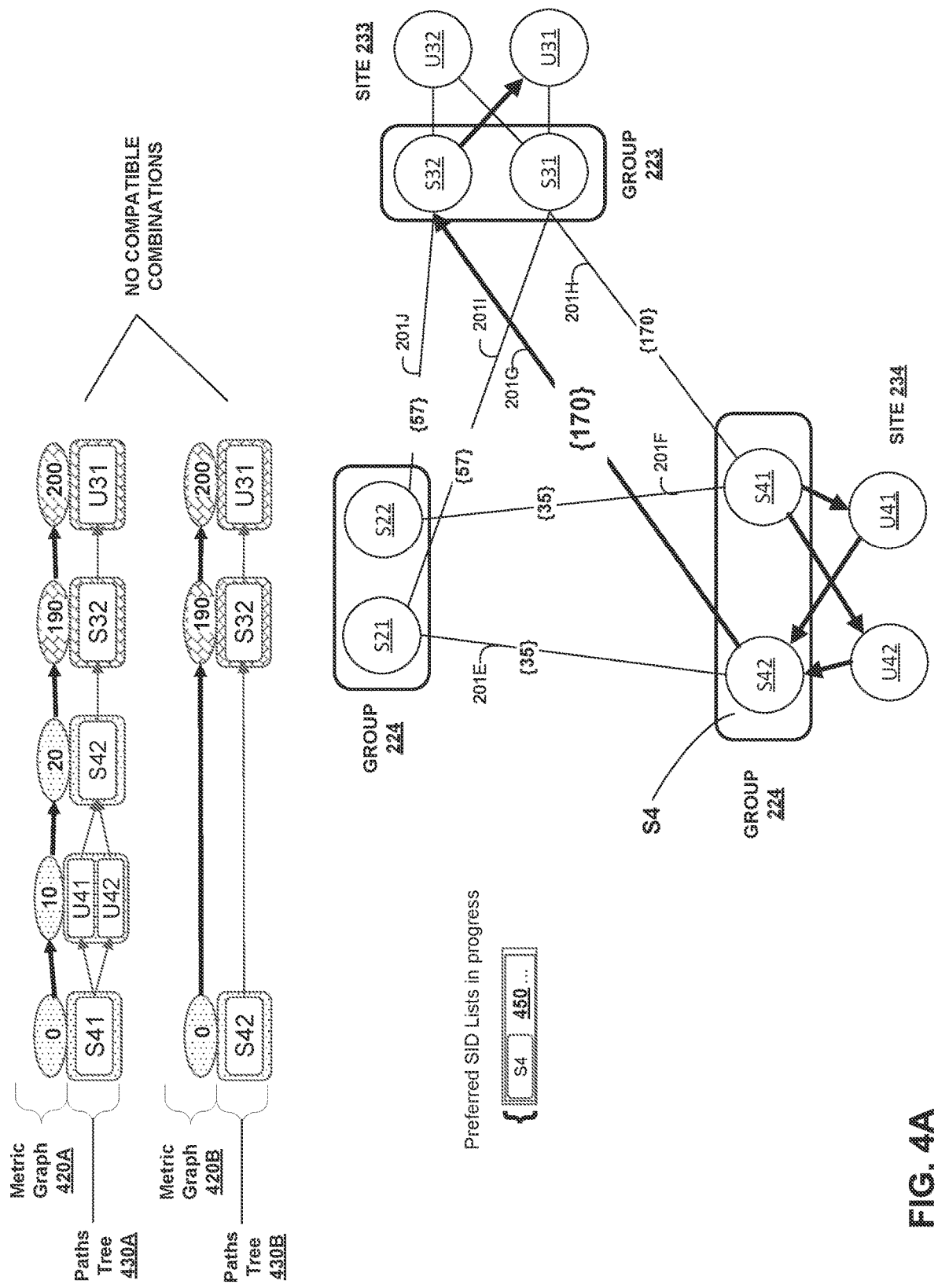
FIGS. 4A-4C are block diagrams illustrating a process for computing lists of segment identifiers (SIDs) that satisfy each of a plurality of paths, with a modified network, in the multipath solution for a segment routing (SR) policy.
Figure 4B:
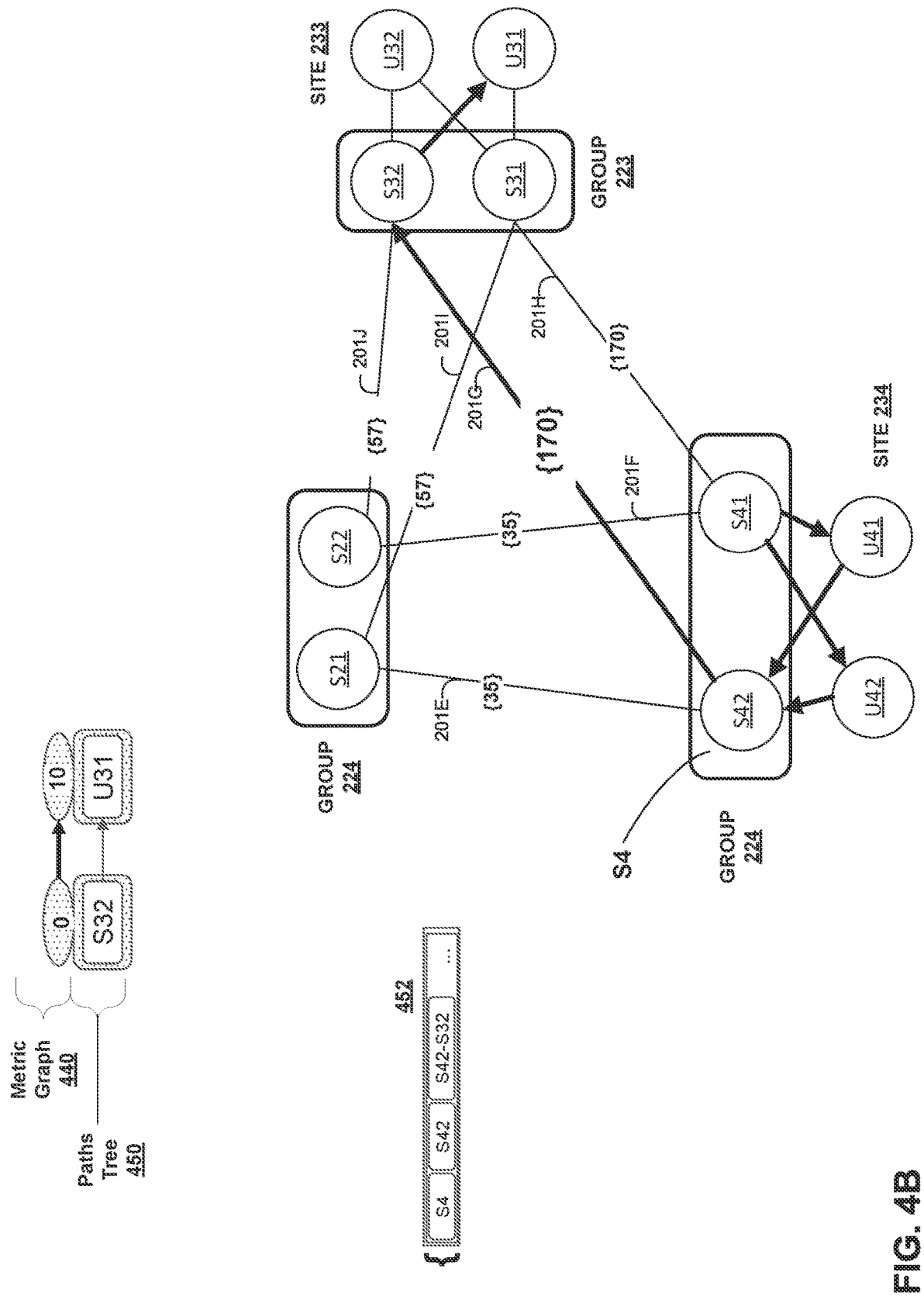
Figure 4C:
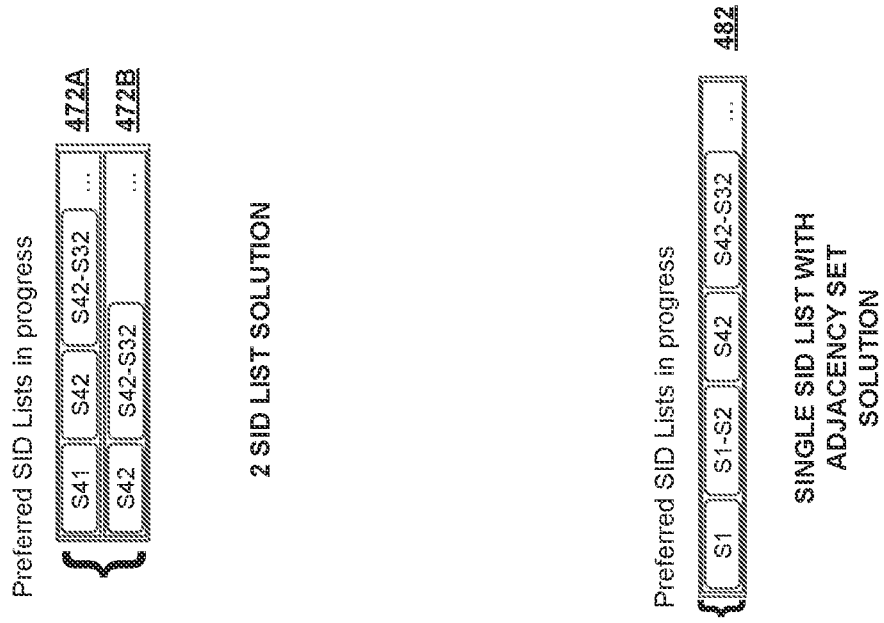

FIGS. 4A-4C are block diagrams illustrating a process for computing lists of segment identifiers (SIDs) that satisfy each of paths 230, with a modified network 212 from FIGS. 2A-2B, in the multipath solution for a segment routing (SR) policy. Network 212 in FIG. 4A has been modified by changing the metric for link 201G from 70 to 170. As a result, the shortest path from anycast group 224 to U31 is no longer via link 201G but instead via S21 and S22. This causes previously compatible MG nodes of MGs 420A, 420B rooted as S41, S42, respectively, to be "not containing" and eliminated from consideration as candidate MG nodes. Controller 108 therefore must force traffic through link 201G carrying the multipath using an adjacency SID. To have an adjacency SID for link 201G, the ingress S42 of the adjacency must also be a SID.

In other words, sometimes it is necessary to use adjacency SIDs to force traffic onto expensive links. Taking the previous example with the metric for the second link between sites 233 and 234 also set to 170, it is seen that all shortest multipaths from S41 and S42 to S32 and U31 veer onto links not in the requested multipath. As adjacency SIDs are not routable, they may be preceded with node SIDs that get the traffic to the node with the adjacency. Adding S42, S42-S32 to the SID list will cover the highlighted sub-multipath, but the anycast S4 will direct some of the traffic to S42, which may not be able to pop both S4 and S42, depending on the SR implementation.

FIG. 4C illustrates two solutions to the above problem, a first solution with 2 SID lists 472A, 472B, and a second solution with a single SID list that uses a set of adjacencies (all adjacencies from Site 231 ("S1") to Site 232 ("S2")).

Controller 108 may compute computed paths 230 using one or more constraint-based path computation algorithms (e.g., constrained shortest path first, or CSPF) that require any acceptable path to meet a set of defined constraints, such as those policy constraints specified in an SR policy for which controller 108 computes computed paths 230. In accordance with techniques described herein, controller 108 may compute computed paths 230 to satisfy a bandwidth constraint such that the collection of shortest paths has sufficient available bandwidth to meet the amount of bandwidth for the SR policy, as indicated by the bandwidth constraint.

Controller 108 that computes a solution, from a multipath that satisfies the bandwidth constraint, with a list of SIDs may install the list of SIDs into network 112 for use by network nodes 19 to forward traffic steered to the SR policy.

Figure 5:
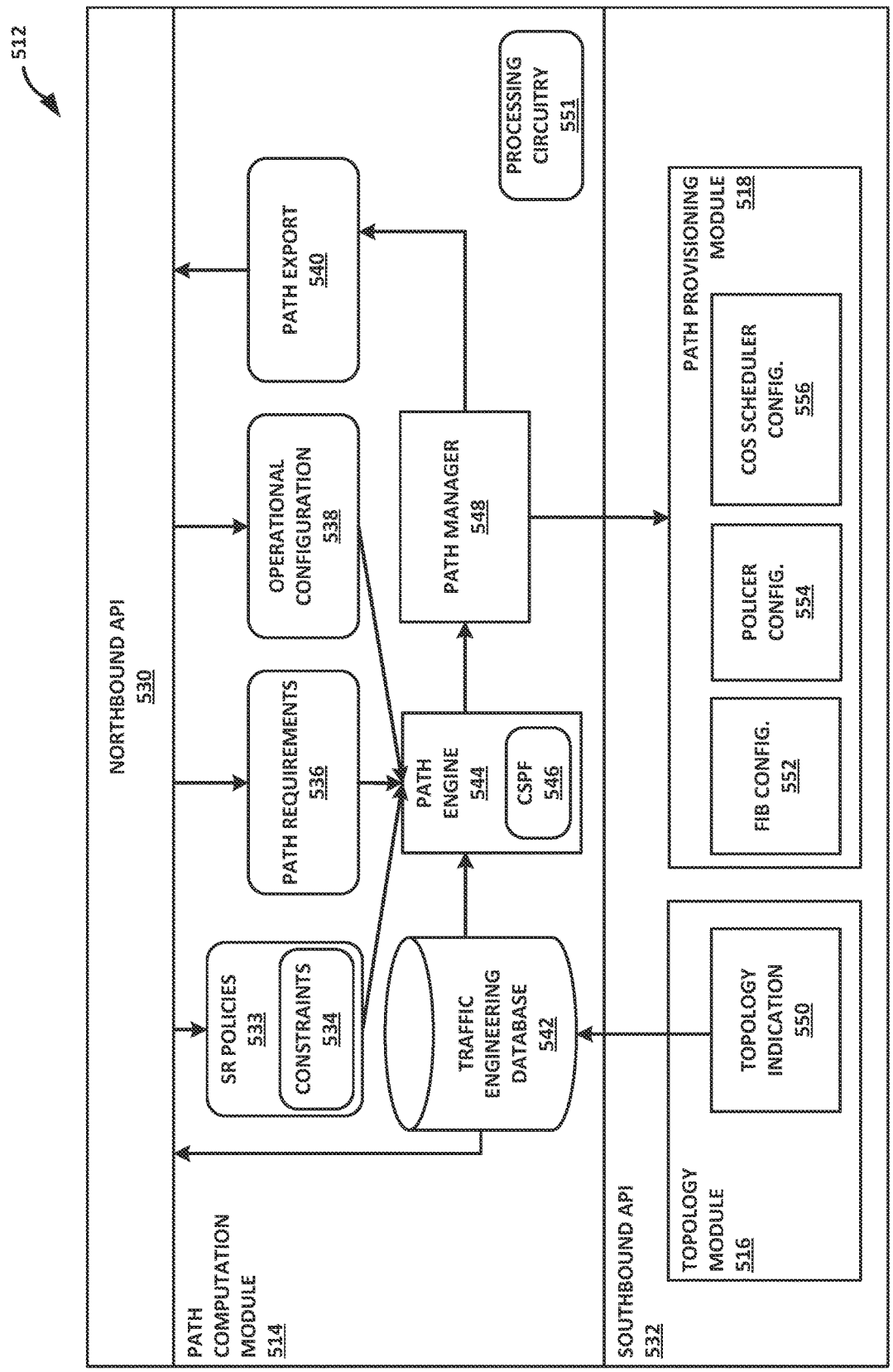
FIG. 5 is a block diagram illustrating an example controller, according to techniques of this disclosure.

FIG. 5 is a block diagram illustrating an example controller, according to techniques of this disclosure. Controller 512 may represent an example implementation of controller 108. Controller 512 may be or implement a WAN controller, software-defined networking (SDN) controller, and/or path computation element, for instance.

In general, path computation module 514 and path provisioning module 518 of controller 512 may use the protocols to instantiate paths between the Path Computation Clients (e.g., routers) in a network. Southbound API 532 allows controller 512 to communicate with SR-enabled and other network nodes, e.g., routers and switches of the network using, for example, ISIS, OSPFv2, BGP-LS, and PCEP protocols. By providing a view of the global network state and bandwidth demand in the network, controller 512 is able to compute optimal paths and provision the network for forwarding using lists of SIDs in an SR paradigm.

In some examples, application services issue path requests to controller 512 to request paths in a path computation domain controlled by controller 512. For example, a path request includes a required bandwidth or other constraint and two endpoints representing an access node and an edge node that communicate over the path computation domain managed by controller 512. Path requests may further specify time/date during which paths must be operational and CoS parameters (for instance, bandwidth required per class for certain paths).

Controller 512 accepts path requests from application services to establish paths between the endpoints over the path computation domain. Paths may be requested for different times and dates and with disparate bandwidth requirements. Controller 512 reconciling path requests from application services to multiplex requested paths onto the path computation domain based on requested path parameters and anticipated network resource availability.

To intelligently compute and establish paths through the path computation domain, controller 512 includes topology module 516 to maintain topology information (e.g., a traffic engineering database) describing available resources of the path computation domain, including access, aggregation, and edge nodes, interfaces thereof, and interconnecting communication links.

Path computation module 514 of controller 512 computes requested paths through the path computation domain. In general, paths are unidirectional. Upon computing paths, path computation module 514 schedules the paths for provisioning by path provisioning module 518. A computed path includes path information usable by path provisioning module 518 to establish the path in the network. Provisioning a path may require path validation prior to committing the path to provide for packet transport.

Further example details of a distributed WAN controller may be found in U.S. Pat. No. 9,450,817, entitled "Software Defined Network Controller," the entire contents of which is incorporated herein by reference. This is merely one example, and controller 512 may compute and provision paths in other ways.

In this example, controller 512 includes northbound and southbound interfaces in the form of northbound application programming interface (API) 530 and southbound API (532). Northbound API 530 includes methods and/or accessible data structures by which, as noted above, application services may configure and request path computation and query established paths within the path computation domain. Southbound API 532 includes methods and/or accessible data structures by which controller 512 receives topology information for the path computation domain and establishes paths by accessing and programming data planes of aggregation nodes and/or access nodes within the path computation domain.

Path computation module 514 includes data structures to store path information for computing and establishing requested paths. These data structures include SR policies 533 having SR policy constraints 534, path requirements 536, operational configuration 538, and path export 540. Applications may invoke northbound API 530 to install/query data from these data structures. SR policy constraints 534 includes data that describes external constraints upon path computation.

Using northbound API 530, a network operator may configure SR policies 533. Any of SR policies 533 may specify one or more SR policy constraints 534 that limit the acceptable paths for the SR policy to those that satisfy the policy constraints. According to techniques of this disclosure, SR policies 533 specify a bandwidth constraint for a given one of SR policies 533. Path engine 544 computes one or more paths for an SR policy to collectively satisfy any bandwidth constraint in constraints 534 for the SR policy.

Applications may modify attributes of a link to effect resulting traffic engineering computations. In such instances, link attributes may override attributes received from topology indication module 550 and remain in effect for the duration of the node/attendant port in the topology. The link edit message may be sent by the controller 512.

Operational configuration 538 represents a data structure that provides configuration information to controller 512 to configure the path computation algorithm with respect to, for example, class of service (CoS) descriptors and detour behaviors. Operational configuration 538 may receive operational configuration information in accordance with CCP. An operational configuration message specifies CoS value, queue depth, queue depth priority, scheduling discipline, over provisioning factors, detour type, path failure mode, and detour path failure mode, for instance. A single CoS profile may be used for the entire path computation domain. The Service Class assigned to a Class of Service may be independent of the node as an attribute of the path computation domain.

Path export 540 represents an interface that stores path descriptors for all paths currently committed or established in the path computation domain. In response to queries received via northbound API 530, path export 540 returns one or more path descriptors. Queries received may request paths between any two edge and access nodes terminating the path(s). In some examples, path descriptors may be used by Applications to set up forwarding configuration at the edge and access nodes terminating the path(s). A path descriptor may include an Explicit Route Object (ERO). A path descriptor or "path information" may be sent, responsive to a query from an interested party. A path export message delivers path information including path type (primary or detour); bandwidth for each CoS value. In response to receiving the path descriptor, the receiving device may use RSVP-TE to signal an MPLS LSP from the ingress to the egress of the path.

Path requirements 536 represent an interface that receives path requests for paths to be computed by path computation module 514 and provides these path requests (including path requirements) to path engine 544 for computation. Path requirements 536 may be received or may be handled by the controller. In such instances, a path requirement message may include a path descriptor having an ingress node identifier and egress node identifier for the nodes terminating the specified path, along with request parameters including CoS value and bandwidth. A path requirement message may add to or delete from existing path requirements for the specified path.

Topology module 516 includes topology indication module 550 to handle topology discovery and, where needed, to maintain control channels between controller 512 and nodes of the path computation domain. Topology indication module 550 may include an interface to describe received topologies to path computation module 514.

Topology indication module 550 may use a topology discovery protocol to describe the path computation domain topology to path computation module 514. In one example, using a cloud control protocol mechanism for topology discovery, topology indication module 550 may receive a list of node neighbors, with each neighbor including a node identifier, local port index, and remote port index, as well as a list of link attributes each specifying a port index, bandwidth, expected time to transmit, shared link group, and fate shared group, for instance.

Topology indication module 550 may communicate with a topology server, such as a routing protocol route reflector, to receive topology information for a network layer of the network. Topology indication module 550 may include a routing protocol process that executes a routing protocol to receive routing protocol advertisements, such as Open Shortest Path First (OSPF) or Intermediate System-to-Intermediate System (IS-IS) link state advertisements (LSAs) or Border Gateway Protocol (BGP) UPDATE messages. Topology indication module 550 may in some instances be a passive listener that neither forwards nor originates routing protocol advertisements. In some instances, topology indication module 550 may alternatively, or additionally, execute a topology discovery mechanism such as an interface for an Application-Layer Traffic Optimization (ALTO) service. Topology indication module 550 may therefore receive a digest of topology information collected by a topology server, e.g., an ALTO server, rather than executing a routing protocol to receive routing protocol advertisements directly.

In some examples, topology indication module 550 receives topology information that includes traffic engineering (TE) information. Topology indication module 550 may, for example, execute Intermediate System-to-Intermediate System with TE extensions (IS-IS-TE) or Open Shortest Path First with TE extensions (OSPF-TE) to receive TE information for advertised links. Such TE information includes one or more of the link state, administrative attributes, and metrics such as bandwidth available for use at various LSP priority levels of links connecting routers of the path computation domain. In some instances, indication module 550 executes BGP-TE to receive advertised TE information for inter-autonomous system and other out-of-network links.

Traffic engineering database (TED) 542 stores topology information, received by topology indication module 550, for a network that constitutes a path computation domain for controller 512 to a computer-readable storage medium (not shown). TED 542 may include one or more link-state databases (LSDBs), where link and node data is received in routing protocol advertisements, received from a topology server, and/or discovered by link-layer entities such as an overlay controller and then provided to topology indication module 550. In some instances, an operator may configure traffic engineering or other topology information within MT TED 542 via a client interface.

Path engine 544 accepts the current topology snapshot of the path computation domain in the form of TED 542 and computes, using TED 542, CoS-aware traffic-engineered paths between nodes as indicated by configured node-specific policy (constraints 534) and/or through dynamic networking with external modules via APIs. Path engine 544 may further compute detours for all primary paths on a per-CoS basis according to configured failover and capacity requirements (as specified in operational configuration 538 and path requirements 536, respectively).

In general, to compute a requested path, path engine 544 determines based on TED 542 and all specified constraints whether there exists a path in the layer that satisfies the TE specifications for the requested path for the duration of the requested time. Path engine 544 may use the Dijkstra constrained SPF (CSPF) 546 path computation algorithms for identifying satisfactory paths though the path computation domain. If there are no TE constraints, path engine 544 may revert to SPF. If a satisfactory computed path for the requested path exists, path engine 544 provides a path descriptor for the computed path to path manager 548 to establish the path using path provisioning module 518. A path computed by path engine 544 may be referred to as a "computed" path. As described in further detail below, path engine 544 may determine lists of SIDs for a plurality of paths computed by path engine 544 for an SR policy of SR policies 533.

Path manager 548 establishes computed scheduled paths using path provisioning module 518, which in this instance includes forwarding information base (FIB) configuration module 552 (illustrated as "FIB CONFIG. 552"), policer configuration module 554 (illustrated as "POLICER CON- FIG. 5 54"), and CoS scheduler configuration module 556 (illustrated as "COS SCHEDULER CONFIG. 556").

FIB configuration module 552 programs forwarding information to data planes of aggregation nodes or access nodes of the path computation domain. The FIB of an aggregation node or access node includes the MPLS switching table, the detour path for each primary LSP, the CoS scheduler per-interface and policers at LSP ingress. FIB configuration module 552 may implement, for instance, a software-defined networking (SDN) protocol such as the OpenFlow protocol or the I2RS protocol to provide and direct the nodes to install forwarding information to their respective data planes. Accordingly, the "FIB" may refer to forwarding tables in the form of, for instance, one or more OpenFlow flow tables each comprising one or more flow table entries that specify handling of matching packets. FIB configuration module 552 may in addition, or alternatively, implement other interface types, such as a Simple Network Management Protocol (SNMP) interface, path computation element protocol (PCEP) interface, a Device Management Interface (DMI), a CLI, Interface to the Routing System (I2RS), or any other node configuration interface. FIB configuration module interface 62 establishes communication sessions with aggregation nodes or access nodes to install forwarding information to receive path setup event information, such as confirmation that received forwarding information has been successfully installed or that received forwarding information cannot be installed (indicating FIB configuration failure).

FIB configuration module 552 may add, change (i.e., implicit add), or delete forwarding table entries in accordance with information received from path computation module 514. A FIB configuration message from path computation module 514 to FIB configuration module 552 may specify an event type (add or delete); a node identifier; a path identifier; one or more forwarding table entries each including an ingress port index, ingress label, egress port index, and egress label; and a detour path specifying a path identifier and CoS mode.

Policer configuration module 554 may be invoked by path computation module 514 to request a policer be installed on a particular aggregation node or access node for a particular LSP ingress. As noted above, the FIBs for aggregation nodes or access nodes include policers at LSP ingress. Policer configuration module 554 may receive policer configuration requests. A policer configuration request message may specify an event type (add, change, or delete); a node identifier; an LSP identifier; and, for each class of service, a list of policer information including CoS value, maximum bandwidth, burst, and drop/remark. FIB configuration module 552 configures the policers in accordance with the policer configuration requests.

CoS scheduler configuration module 556 may be invoked by path computation module 514 to request configuration of CoS scheduler on the aggregation nodes or access nodes. CoS scheduler configuration module 556 may receive the CoS scheduler configuration information. A scheduling configuration request message may specify an event type (change); a node identifier; a port identity value (port index); and configuration information specifying bandwidth, queue depth, and scheduling discipline, for instance.

Path engine 544 may compute lists of segment identifiers (SIDs) that satisfy each path in a multipath solution for a segment routing (SR) policy. Path provisioning module 518 may output the lists of SIDs to the SR-enabled network nodes to provision the network to forward traffic along the multipath.

Topology indication module 550 may receive an indication that a network topology for a network managed by controller 512 has changed to a modified network topology. The indication may be, for example, an update to a link status indicating the link is down (or up), has different bandwidth availability or bandwidth status, has a different metric, or color, has a different Shared Risk Link Group, or other change to a link status. The indication may be, for example, an indication of a failed network node that affects the link statuses of multiple different links. Topology module 516 may update traffic engineering database 542 with a modified topology that is modified based on the indication received by topology indication module 550.

Controller 512 includes a hardware environment including processing circuitry 551 for executing machine-readable software instructions for implementing modules, interfaces, managers, and other components illustrated and described with respect to controller 512. The components may be implemented solely in software, or hardware, or may be implemented as a combination of software, hardware, or firmware. For example, controller 512 may include one or more processors comprising processing circuitry 551 that execute program code in the form of software instructions. In that case, the various software components/modules may comprise executable instructions stored on a computer-readable storage medium, such as computer memory or hard disk (not shown).

Figure 6:
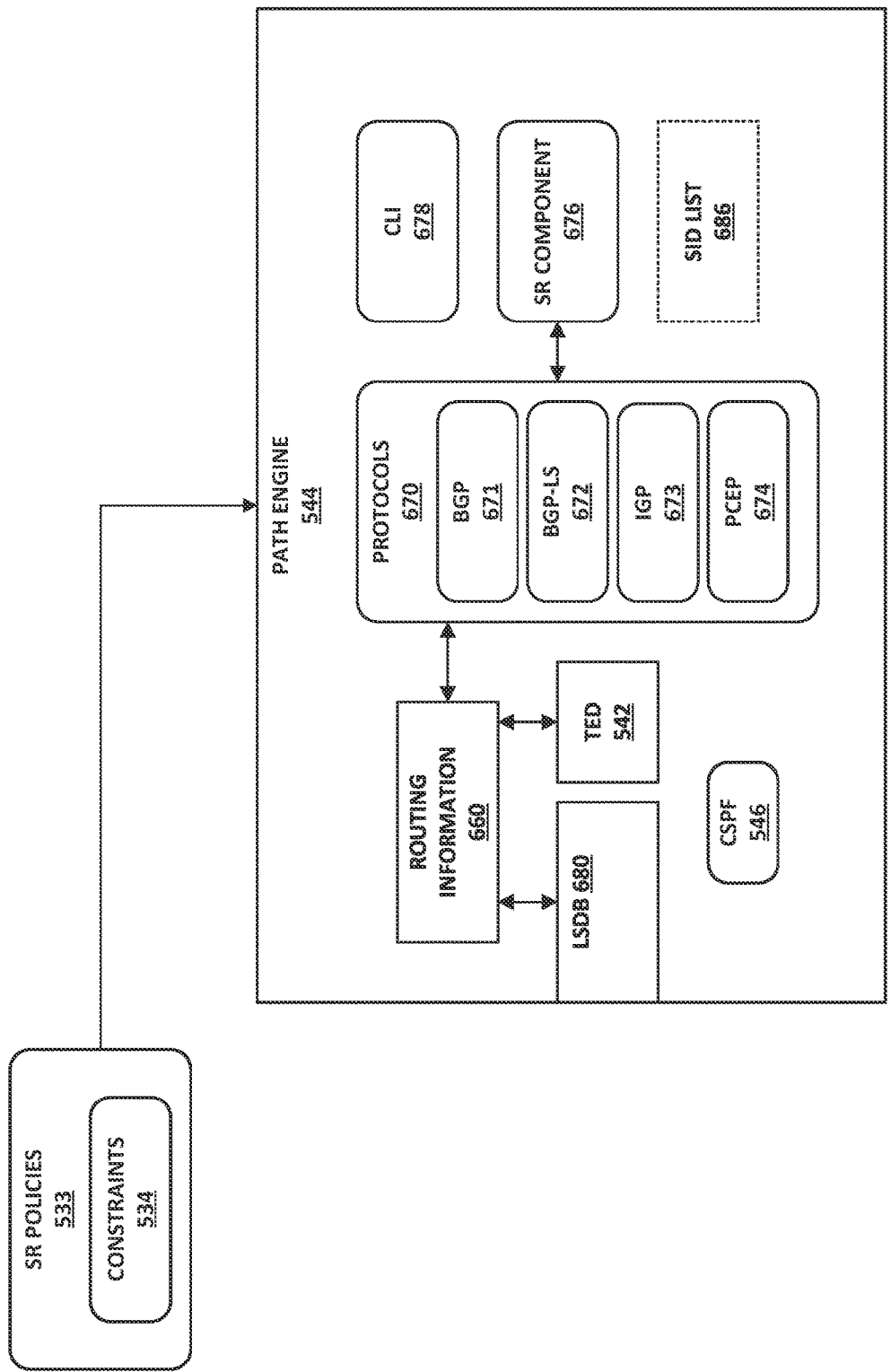
FIG. 6 is a block diagram illustrating an example implementation of a path engine for an example controller according to techniques of this disclosure, in further detail.

FIG. 6 is a block diagram illustrating an example implementation of path engine 544 in further detail. Path engine 544 may execute various routing protocols 670 at different layers of a network stack. Path engine 544 is responsible for the maintenance of routing information 660 to reflect the current topology of a network. Routing information 660 may include TED 542 and LSDB 680. In particular, routing protocols periodically update routing information 660 to accurately reflect the topology of the network and other entities based on routing protocol messages received by controller 512. The protocols may be software processes executing on one or more processors. For example, path engine 544 includes network protocols that operate at a network layer of the network stack, which are typically implemented as executable software instructions. The operations may overlap or instead by performed by topology module 516.

Protocols 670 may include Border Gateway Protocol (BGP) 671 to exchange routing and reachability information among routing domains in a network and BGP-LS 672 to exchange traffic engineering and segment routing policy information among routing domains in the network. Protocols 670 may also include IGP 673 to exchange link state information and facilitate forwarding of packets or other data units between routers within each of the routing domains. In some examples, IGP 673 may include an IS-IS routing protocol that implements an IGP for exchanging routing and reachability information within a routing domain IGP 673 may include IS-IS extensions that support traffic engineering. In some examples, protocols 670 may include both an OSPF component and an IS-IS component.

Protocols 670 may also include configuration protocols. For example, protocols 670 may include PCEP 674 or NETCONF.

Path engine 544 includes an SR component 676 to implement techniques described herein to generate lists of SIDs for a multipath computed to satisfy an SR policy that specifies a bandwidth constraint. SID list 686 includes one or more SID lists, which may be provisioned by controller 518 to a network for segment routing. An ingress router may use the SIDs to steer a packet through a controlled set of instructions, called segments, by prepending the packet with a SID label stack in a segment routing header or MPLS label stack. Protocols 670 may include other routing protocols (not shown), such as Label Distribution Protocol (LDP), Resource Reservation Protocol with Traffic Extensions (RSVP-TE), routing information protocol (RIP), or other network protocols.

In this example, path engine 544 includes a command line interface (CLI) 678 that provides access for a network operator (or other administrator or computing agent) to monitor, configure, or otherwise manage path computation and, in some cases, SR policies. An administrator may, via CLI 678, configure aspects of controller 512, including aspects relating to routing as well as computing and provisioning lists of SIDs for multipaths. CLI 678 (and/or northbound API 530) may enable specifying source, destination, user constraints, preferences, SR policies, and other configurable information. CLI 678 may be used in lieu of, or in addition to, northbound API 530.

Figure 7:
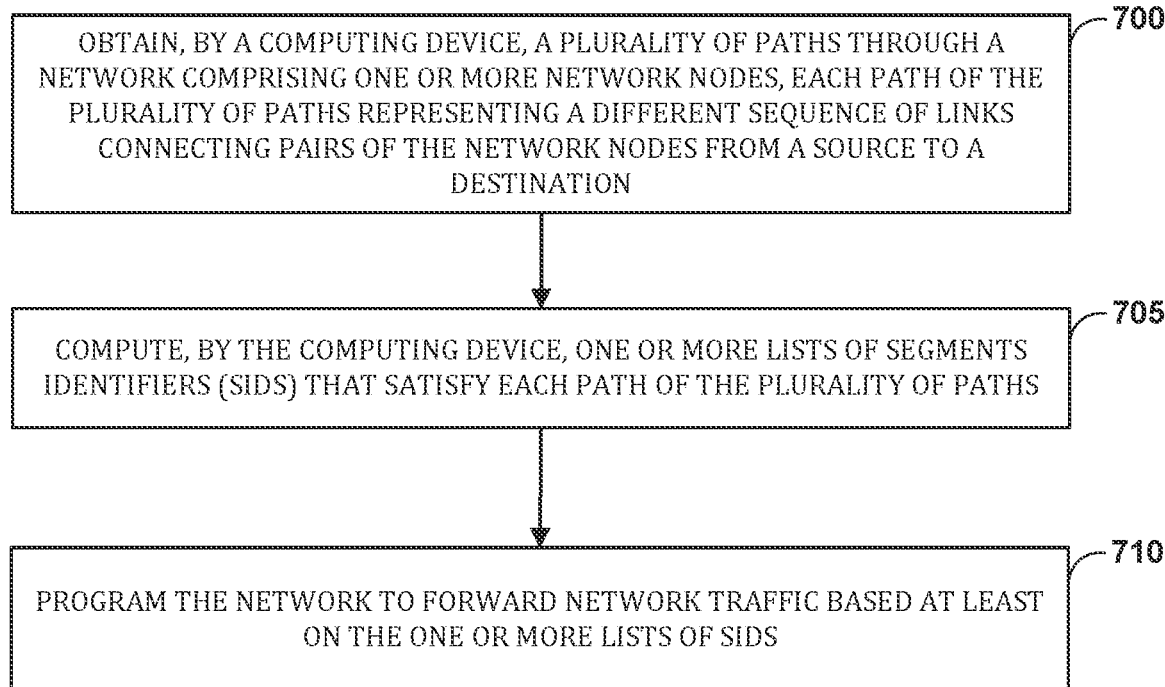
FIG. 7 is a flow diagram illustrating an example operation of a computing device, in accordance with one or more techniques of this disclosure.

FIG. 7 is a flow diagram illustrating an example operation of a computing device, in accordance with one or more techniques of this disclosure. The computing device may be a computing device of controller 108 or 518 or other controller described herein, or may represent a network node, such as a head-end or ingress router for an SR policy. The flow diagram is described with respect to controller 108, however. As seen in the example of FIG. 7, controller 108 may obtain a plurality of paths 230 through a network 212 comprising one or more network nodes 119, each path of the plurality of paths 230 representing a different sequence of links connecting pairs of the network nodes from a source network node to a destination network node (700). The paths 230 can be used to realize an SR policy. Next, controller 108 may compute one or more lists of segments identifiers (SIDs) that satisfy each path of the plurality of paths (705). In some examples, any of the lists of SIDs satisfies each path of the plurality of paths by itself. However, in some examples, the lists of SIDs may satisfy all of the paths collectively, not necessarily individually. In some cases, controller computes the one or more lists of SIDs by computing, based on the metrics for the links, an equidistant metric graph rooted at the source network node 119, the equidistant metric graph comprising metric graph nodes and directed edges representing the links, each metric graph node of the metric graph nodes representing at least one network node 119, of the one or more network nodes 119, that are a same distance from the source network node along at least one path, of the plurality of paths 230, based on the metrics for the links represented in the plurality of paths 230. Next, controller 108 may program the network 112 to forward network traffic based at least on the one or more lists of SIDs (710).

In accordance with techniques of this disclosure, the computing device may perform step 700 to obtain, to realize an SR policy, the plurality of paths through the network to satisfy a bandwidth constraint specified for the SR policy.

Figure 8:
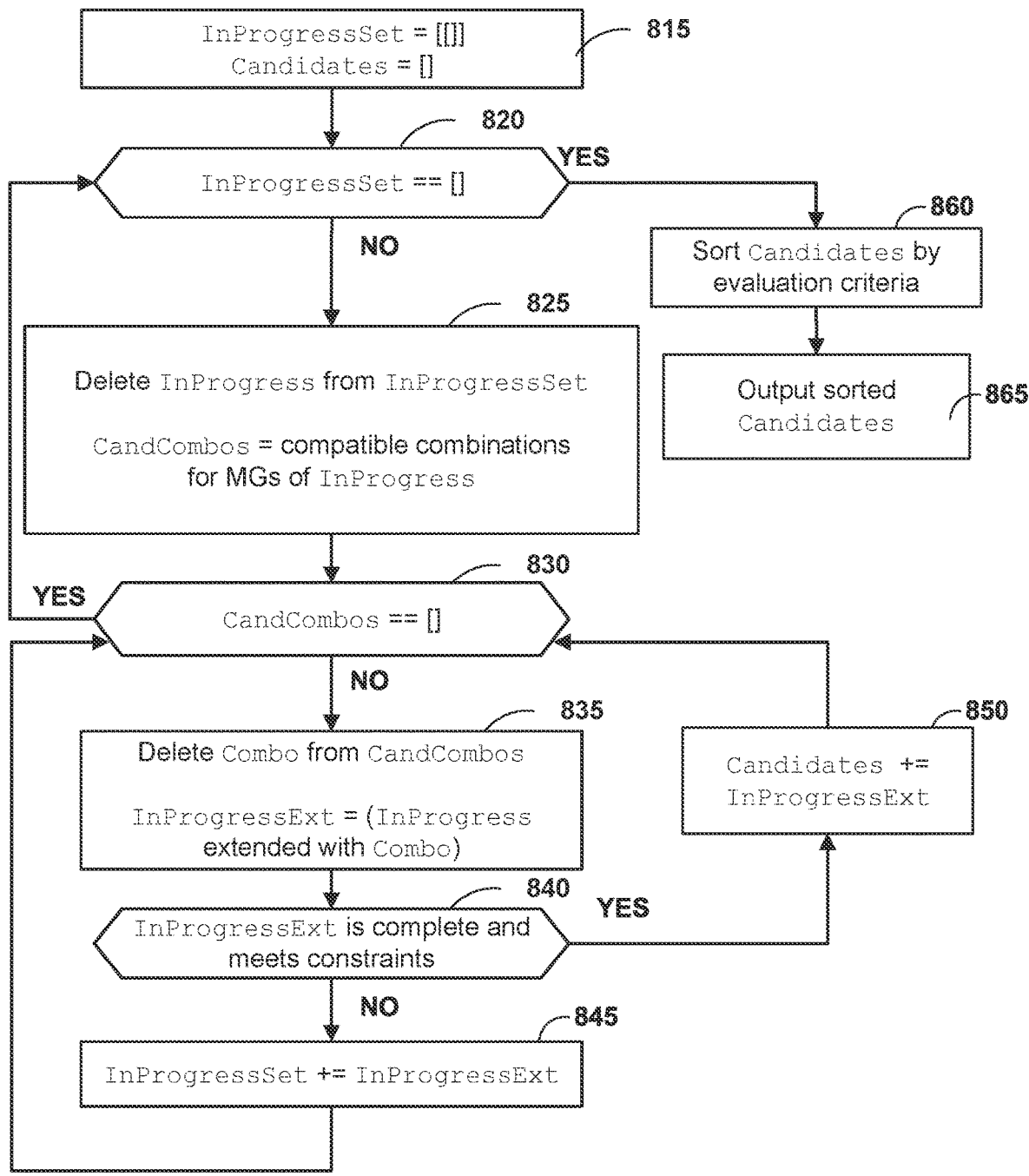
FIG. 8 is a flow diagram illustrating an example operation, performed by a computing device, for computing candidate lists of SIDs for implementing a multipath, according to techniques of this disclosure.

FIG. 8 is a flow diagram illustrating an example operation, performed by a computing device, for computing candidate lists of SIDs for implementing a multipath, according to techniques of this disclosure. The operation is performed after the computing device obtains data describing a plurality of paths. The data may describe the paths using links, nodes, interfaces, or some combination thereof.

The operation is initialized by setting InProgressSet to [[ ]] and Candidates to [ ] (815). InProgressSet may correspond to candidate lists of SIDs in progress, described elsewhere in this document. Candidates may be Candidate solutions to the SID minimization problem (i.e., lists of SIDs) that satisfy, e.g. collectively or individually, the multipath to implement an SR policy. Each of Candidates is a set of one or more SID lists.

At a next step, which enters a loop, if not InProgressSet==[ ] (i.e., it's not empty, NO branch of 820), the computing device deletes InProgress from InProgressSet and sets Cand (idate) Combos to compatible combinations for MGs of InProgress (825).

The process then enters another loop. If not CandCombos==[ ] (i.e., it's empty, NO branch of 830), computing device deletes Combo from CandCombos and sets InProgressExt to (InProgress extended with Combo) (835). If InProgressExt is complete and meets the user constraints (YES branch of 840), the computing device adds InProgressExt to Candidates (850) and loops back to (830). If InProgressExt is not complete or does not meet the user constraints (NO branch of 840), computing device must continue extending this candidate list of SIDs in progress and thus adds InProgressExt to InProgressSet (845). The computing device loops to the test for this internal loop (830).

If CandCombos==[ ] (YES branch of 830), computing device loops back to (820) to determine whether there are additional In Progress Sets. If InProgressSet==[ ] (empty, YES branch of 820), then computing device sorts the Candidates by evaluation criteria (860) and outputs the sorted Candidates as lists of SIDs for the network to use for forwarding on the multipath (865).

User constraints may include:
network node unable to perform multiple pops
network node maximum SID depth (MSD) limit (length of SID list)
other user constraints
Configurable criteria for SID list computation preferences may include:
Minimize SID list length
Minimize number of SID lists
SID type preferences (e.g., prefix SID>node SID>adjacency SID)
Stability of paths under link failures (e.g., prefer stable paths)
The each of the criteria may be weighted when computing the SID lists.

Figure 9A:
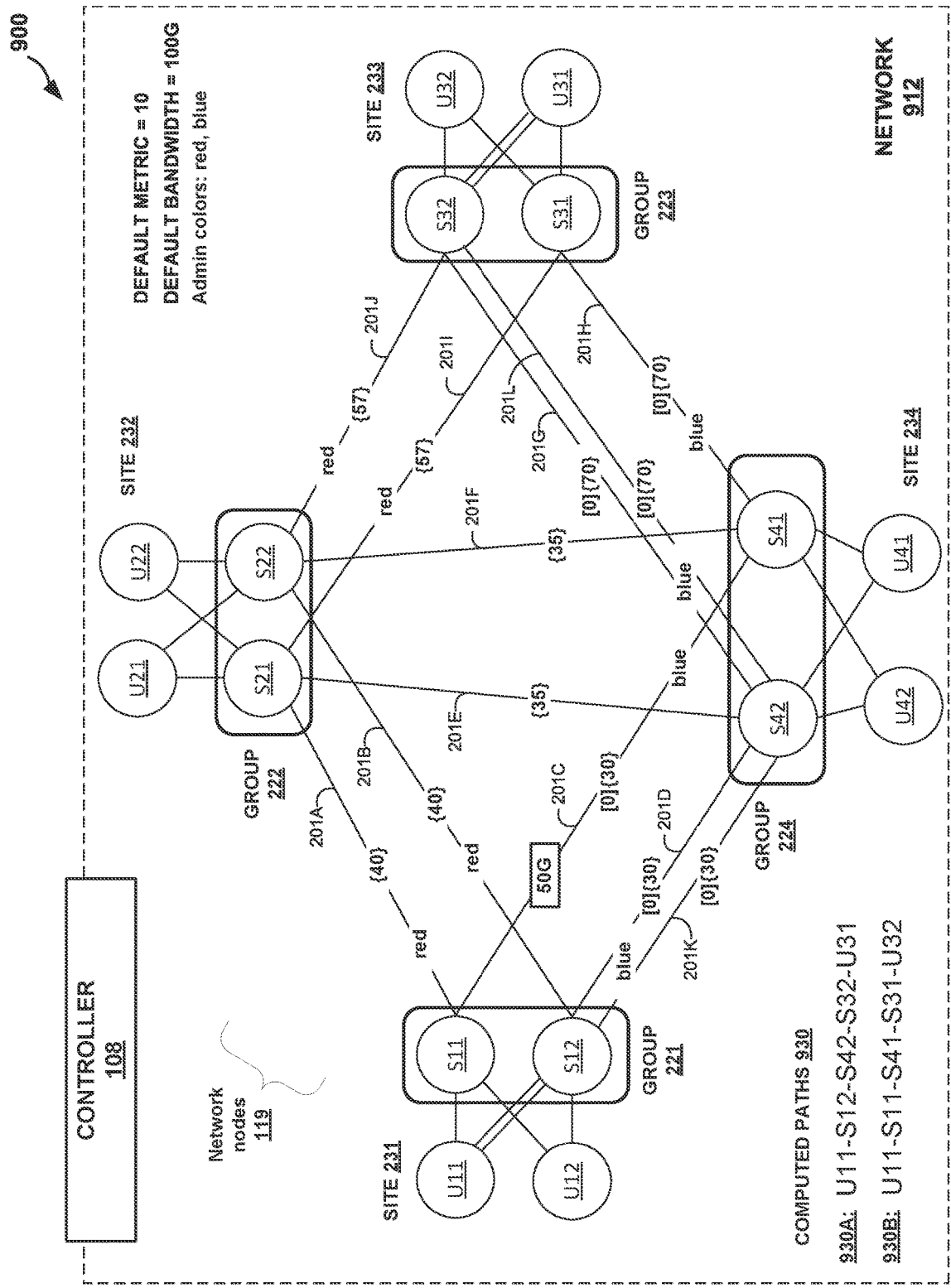
FIGS. 9A-9B are block diagrams illustrating example network topologies for which a controller computes a multipath for an SR policy, in accordance with techniques of this disclosure.
Figure 9B:
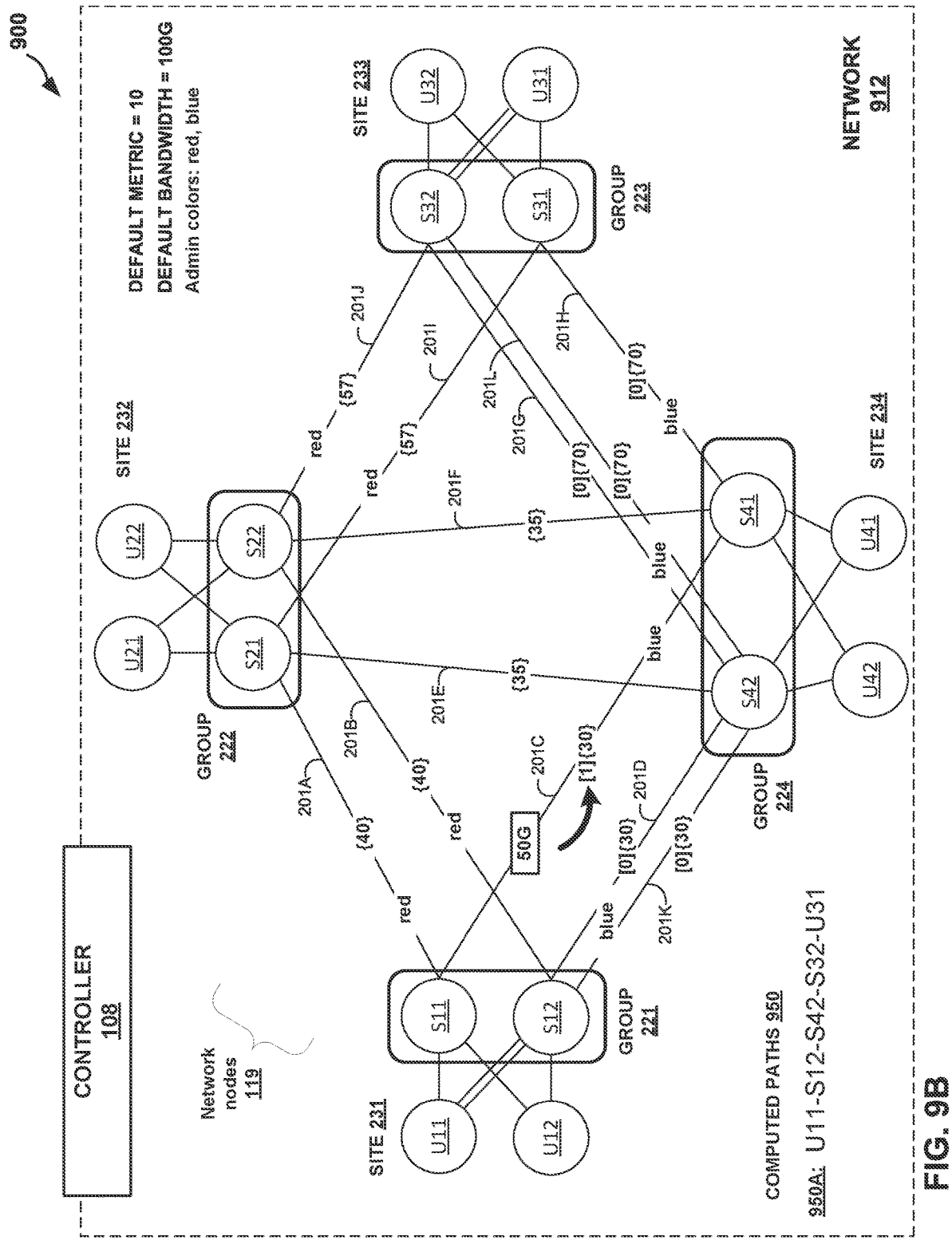

In general, list of SIDs computation algorithms described herein may apply heuristics to:
Leverage MGs to find node and anycast options
Greedy heuristic to generate likely good solutions early
Search to generate alternatives
Evaluate based on criteria
Parallelize candidate evaluation
Present and visualize alternatives, let operator choose FIGS. 9A-9B are block diagrams illustrating example network topologies for which a controller computes a multipath for an SR policy, in accordance with techniques of this disclosure. System 900 includes network 912, which may be an example of network 112 of FIG. 1.

Network 912 is similar to network 212 of FIGS. 2A-2B. However, link 201H has a metric 70 in network 912. Network 912 includes two parallel links between U11 and S12 and between S32 and U31. Network 912 includes additional link 201K such S12 and S42 have parallel links with identical metrics. Network 912 includes additional link 201L such S42 and S32 have parallel links with identical metrics.

Network 912 has a default bandwidth of 100G. That is, each link has a bandwidth of 100G unless otherwise specified. Link 201C has a bandwidth of 50G to deviate from the default bandwidth. Some of links 201 have administrative colors red or blue in network 912. Network 912 has a default metric of 10. That is, each link has a metric of 10 unless otherwise specified using braces. For example, link 201C has a metric of 30 ("{30}"). Controller 108 obtains topology information for network 912. Controller 108 may use the topology information for network 912 to construct a network topology model for network 912.

A network operator may configure controller 108 with an SR policy. To describe an example path computation according to techniques of this disclosure, the SR policy includes the following constraints: exclude red (paths should not include links with administrative color red), U11 to U31 (paths are from source U11 to destination U31). SR policy also includes a bandwidth constraint of 200G to indicate that a set of one or more computed paths for the SR policy must collectively have 200G of available bandwidth.

Controller 108 may determine available bandwidth for one of links 201 using a variety of methods. For instance, controller 108 may obtain link data that indicates an available bandwidth or a total bandwidth for each of links 201. The link data may be configuration data for the link interfaces. Controller 108 may use PCEP or other protocol to query bandwidth reservation information from network nodes for links 201. For example, controller may query S11 for bandwidth reservation information for link 201C connected to S11. Controller 108 may determine the available bandwidth for a link 201 based on the obtained bandwidth reservation information. For this example, the available bandwidth is as indicated in FIGS. 9A-9B.

Controller 108 computes shortest paths for the SR policy by constructing a network graph of the links to exclude the red links (201A, 201B, 201I, 201J). The network graph includes the link metrics, and controller 108 also assigns a link bandwidth overflow metric with an initial value of 0 to each link. To compute shortest paths from U11 to U31A, controller 108 uses a combined metric that is a combination of the policy metric and the link bandwidth overflow metric. The combination may be a simple sum, a weighted sum, or some other combination to compute a metric value for the link to be used in the shortest paths computation. The link bandwidth overflow metric is illustrated in FIGS. 9A-9B using brackets, e.g., "[0]".

In computing the paths, controller 108 does not apply the bandwidth constraint for the SR policy as a constraint in the shortest path algorithm. The shortest paths are computed paths 930A-930B. Computed path 930B traverses parallel links and is two separate computed paths, for a total of 3 shortest paths.

Controller 108 then computes the amount of bandwidth needed for each path to meet the bandwidth constraint. In general, the traffic percentage is known at each node and is mapped using ECMP (optionally weighted) to the outgoing links. In this example, controller 108 computes the amount of bandwidth simply as the quotient of the bandwidth constraint (200G) divided by the number of paths (3): (200G/3)→~66G. For each path, controller 108 compares this amount of bandwidth needed for the path to the available bandwidth for each link in the path. If the amount of bandwidth exceeds needed for the path exceeds the available bandwidth for a link in the path, the set of computed shortest paths is not a satisfactory solution for the bandwidth constraint. In this example, link 201C having available bandwidth of 50G does not have sufficient available bandwidth to support the ~66G that would be equally allocated, using ECMP, by U11 among the 3 paths. Link 201C is said to have bandwidth overflow, i.e., link 201C has insufficient bandwidth to meet the bandwidth for the multipath required to be transported on link 201C. Computed path 930B therefore cannot be used as a path and the set of computed paths 930, as a potential multipath solution for this example SR policy, does not satisfy the bandwidth constraint and so cannot be used to realize the SR policy.

However, controller 108 does not simply delete computed path 930B from the set of computed shortest paths to arrive at different set of computed shortest paths (i.e., 930A). This may not be possible where there is an overlap of some shortest paths on the same link. Controller 108 instead increases the link bandwidth overflow metric for any links that do not have sufficient available bandwidth to support expected bandwidth usage on the link by a path that includes the link. In this example, controller 108 increases the link bandwidth overflow metric for link 201C from 0 to 1. Controller 108 may simply increment the link bandwidth overflow metric by 1, by another number, or may apply a policy that determines the amount of increase of the link bandwidth overflow metric for a given link 201. FIG. 9B illustrates link 201C with link bandwidth overflow metric [1] and policy metric {30}.

Because one of the links had overflow, controller 108 again computes a set of shortest paths, this time using the updated network graph with the increased link bandwidth overflow metric for link 201C. The combined metric for link 201C is now greater than the combined metric for link 201K and link 201D. Accordingly, previous computed path 930B that included link 201C is longer than what is still the shortest path—computed path 930A—and is no longer a shortest path included in the paths of the computed shortest paths 950, which are computed paths 950A. Like computed path 930A, computed path 950A traverses parallel links and is two separate computed paths. Using a similar procedure as described above, controller 108 determines that each of the two computed paths requires 100G to support the bandwidth constraints. All links of computed paths 950 have the default bandwidth of 100G and therefore have the required bandwidth to support the bandwidth constraints. Controller 108 may therefore provision computed paths 950 in network 912. In some examples, this includes determining one or more lists of SIDs to realize the computed paths 950. In some examples, this includes applying SID minimization techniques described herein to determine one or more lists of SIDs to realize the computed paths 950. Controller 108 may then provision the one or more lists of SIDs to U11, which load balances traffic steered to the SR policy among the computed paths 950. Controller 108 may add a corresponding SRH indicating the corresponding list of SIDs to each packet forwarded on the selected path.

Figure 10:
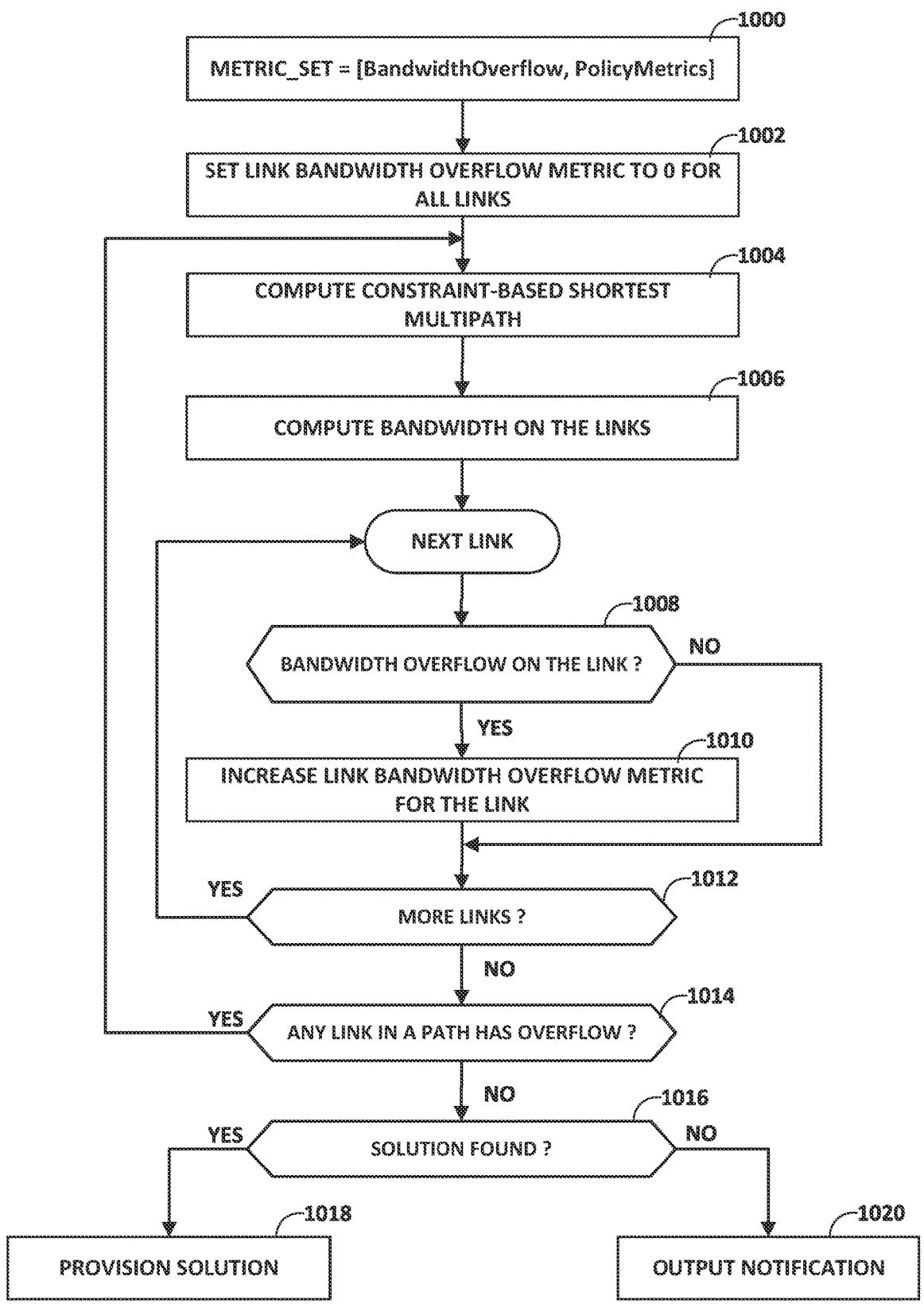
FIG. 10 is a flow diagram illustrating an example operation, performed by a computing device, according to techniques of this disclosure.

FIG. 10 is a flow diagram illustrating an example operation of a computing device, in accordance with one or more techniques of this disclosure. The computing device may be controller 108, controller 512, or one or more of network nodes 19, for instance.

As seen in the example of FIG. 10, the computing device initially may create a metric set for a links of a segment routing-enabled network comprising one or more network nodes (1000). The metric set includes, for each link, a link bandwidth overflow metric and a policy metric (e.g., IGP metric). The computing device initially sets the link bandwidth overflow metric for each link to 0 (1002). For an SR policy, the computing device computes a constraint-based shortest multipath using a combined metric for each link based on a combination of the link bandwidth overflow metric and policy metric for the link (1004). For example, the link metric, for purposes of computing the set of shortest paths that make up a potential multiple, may be a combined metric that is a sum of the link bandwidth overflow metric and policy metric.

The computing device then computes the required bandwidth for each link in the set of shortest paths, based on the bandwidth constraint (1006). To compute the required bandwidth for a link, the computing device may account for paths that use multiple parallel sub-paths with corresponding links; multiple paths that use the same link; and so on. The required bandwidth is based on load balancing the total bandwidth specified by the bandwidth constraint over the set of computed paths using ECMP, or weighted ECMP, for instance.

For each link (YES branch of 1012), if there is a bandwidth overflow (YES branch of 908), the computing device increases the link bandwidth overflow metric for the link (1010). Thus, multiple links may have increased link bandwidth overflow metric during this iteration.

If there are no more links (NO branch of 1012), computing device determines if any link in one of the shortest paths had bandwidth overflow (1014). Computing device may do this by setting and reading a bandwidth overflow flag for an iteration if there is a bandwidth overflow on a link of a shortest path computed in step 1004 for the iteration. If there has been bandwidth overflow (YES branch of 1014), the computing devices attempts to find a new solution by returning to step 1004 and computing a constraint-based shortest multipath based on the modified combined metrics for the links. If there has not been bandwidth overflow (NO branch of 1014), the computing device provisions the multipath solution of the set of computed shortest paths (1018), if found (YES branch of 1016). If the computing device was unable to find a multipath solution that satisfied the bandwidth constraint (NO branch of 1016), the computing device may output a notification indicating a failed SR policy (1020).

Figure 11:
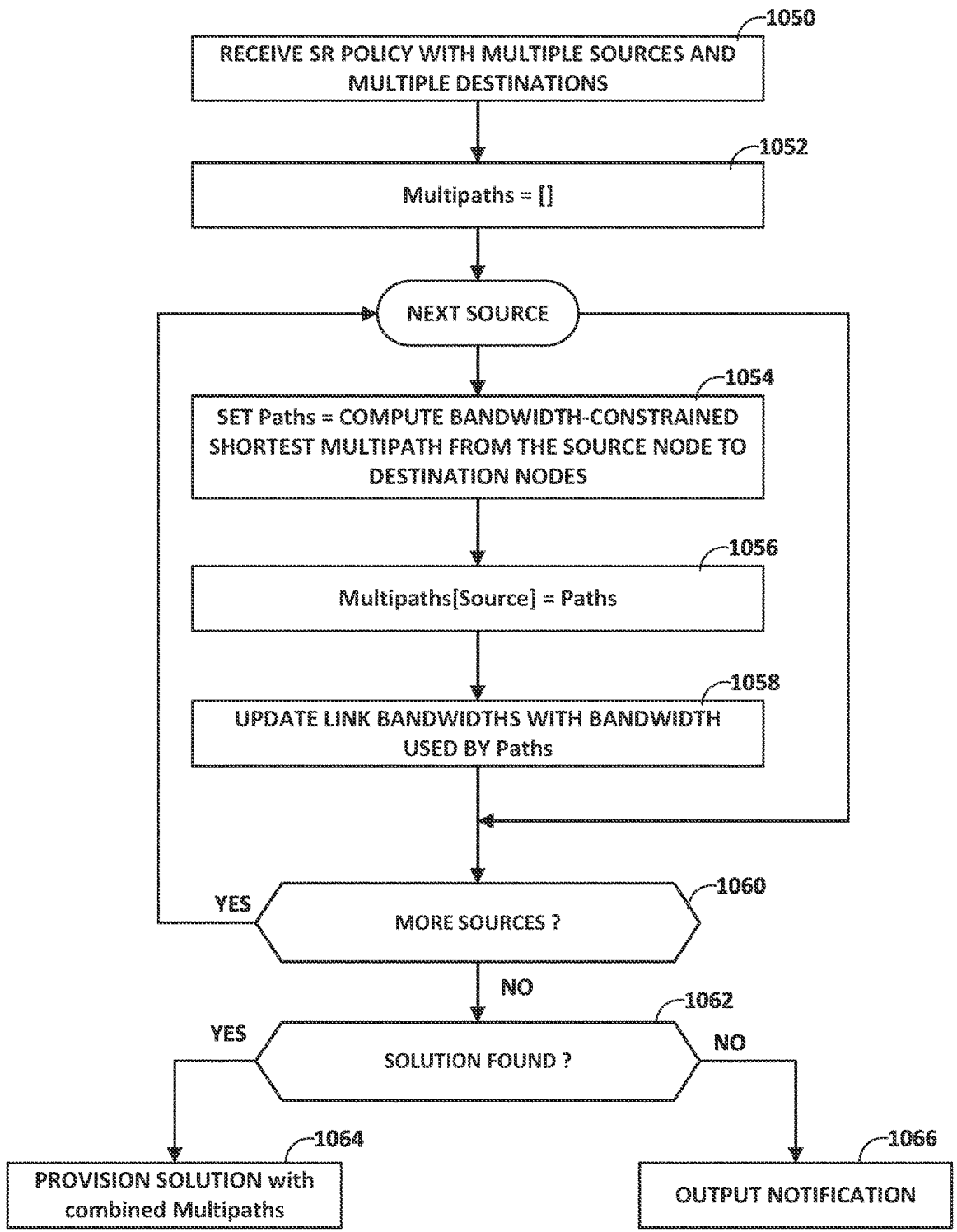
FIG. 11 is a flow diagram illustrating an example operation, performed by a computing device, according to techniques of this disclosure.

FIG. 11 is a flow diagram illustrating an example operation of a computing device, in accordance with one or more techniques of this disclosure. The computing device may be controller 108, controller 512, or one or more of network nodes 19, for instance.

In some cases, the computing device may receive an SR policy that has multiple sources and multiple destinations (1050). In such cases, the computing device creates an initially empty multipaths array (1052). For each source, the computing device may compute a bandwidth-constrained shortest multipath from the source node to the destination nodes (1054). Step 1054 may be performed using the operation illustrated by the flow diagram of FIG. 10, for example. The computing devices sets an element of the Multipaths array corresponding to the source to the bandwidth-constrained shortest multipath (1056). After the computation of a multipath from a source, the link bandwidth is reduced. To account for bandwidth usage by the computed multipath, the computing device updates the link bandwidths with the bandwidths used by the multipath from the source (1058). The computing device may perform steps 1054, 1056, 1058 for each source, or at least until a link is determined to have insufficient bandwidth for a new multipath (1060).

If there is a solution (YES branch of 962), the computing device may provision the respective multipaths for the sources to the network (1064). If the computing device was unable to find a solution (NO branch of 1062), the computing device may output a notification indicating a failed SR policy (1066).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium or computer-readable storage device may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
computing, by a computing device, for a segment routing policy that specifies a bandwidth constraint for the segment routing policy, first shortest paths through a network of network nodes, wherein each shortest path of the first shortest paths represents a different sequence of links connecting pairs of the network nodes from a source to a destination;
computing, by the computing device, based on the bandwidth constraint for the segment routing policy, a required bandwidth for a link of one of the first shortest paths, wherein the required bandwidth for the link is an amount of traffic, for the segment routing policy, expected to be forwarded on the link by the network nodes load balancing the traffic on the first shortest paths;

based on determining, by the computing device, the link has insufficient bandwidth to meet the required bandwidth for the link, increasing a metric of the link;

computing, by the computing device, for the segment routing policy, according to the increased metric of the link, second shortest paths through the network of network nodes; and provisioning the second shortest paths in the network of network nodes.

2. The method of claim 1, further comprising:

computing, by the computing device, based on the bandwidth constraint for the segment routing policy, respective required bandwidths for all links of the second shortest paths as respective amounts of traffic, for the segment routing policy, expected to be forwarded by the network nodes on the links of the second shortest paths; and provisioning the second shortest paths in the network of network nodes based on determining, by the computing device based on the bandwidth constraint for the segment routing policy, all links of the second shortest paths have sufficient bandwidth to meet the respective required bandwidths.

3. The method of claim 1, wherein the computing device comprises one of a controller for the network or a network node of the network nodes.

4. The method of claim 1, wherein the metric of the link is a link bandwidth overflow metric of the link that is separate from a policy metric of the link.

5. The method of claim 4, wherein increasing the metric of the link comprises increasing the link bandwidth overflow metric of the link, and wherein computing the second shortest paths comprises:
computing a combined metric of the link as a combination of the link bandwidth overflow metric of the link and the policy metric of the link; and
executing a shortest path algorithm with the combined metric of the link to compute the second shortest paths.

6. The method of claim 1, further comprising:

computing, by the computing device, one or more lists of segment identifiers to realize the second shortest paths in the network of network nodes, wherein provisioning the second shortest paths in the network of network nodes comprises provisioning the one or more lists of segment identifiers in an ingress node of the network nodes.

7. The method of claim 1, further comprising:

computing, by the computing device, based on the bandwidth constraint for the segment routing policy, the required bandwidth for the link as an amount of traffic, for the segment routing policy, that would be forwarded by the network nodes on the link.

8. The method of claim 1, wherein the segment routing policy specifies a plurality of sources and a plurality of destinations, and wherein the second shortest paths are a first multipath for a first source of the plurality of sources to at least one of the plurality of destinations, the method further comprising:

updating a link bandwidth for each link used by the first multipath;

computing, by the computing device, a second multipath for a second source of the plurality of sources to at least one of the plurality of destinations; and based on determining each link used by the first multipath and the second multipath has sufficient bandwidth for the first multipath and the second multipath, provisioning the first multipath and the second multipath in the network.

9. The method of claim 1, wherein the bandwidth constraint for the segment routing policy comprises an amount of bandwidth that a combined bandwidth of shortest paths through the network of nodes must satisfy to implement the segment routing policy.

10. A computing device comprising:

a memory; and processing circuitry having access to the memory, wherein the processing circuitry and memory are configured to:

compute for a segment routing (SR) policy that specifies a bandwidth constraint for the segment routing policy, first shortest paths through a network of network nodes, wherein each shortest path of the first shortest paths represents a different sequence of links connecting pairs of the network nodes from a source to a destination;

compute, based on the bandwidth constraint for the segment routing policy, a required bandwidth for a link of one of the first shortest paths as an amount of traffic, for the segment routing policy, expected to be forwarded on the link by the network nodes load balancing the traffic on the first shortest paths;

based on a determination the link has insufficient bandwidth to meet the required bandwidth for the link, increase a metric of the link;

compute, for the segment routing policy according to the increased metric of the link, second shortest paths through the network of network nodes; and provision the second shortest paths through the network of network nodes.

11. The computing device of claim 10, wherein the processing circuitry and memory are configured to:

compute, based on the bandwidth constraint for the segment routing policy, respective required bandwidths for all links of the second shortest paths as respective amounts of traffic, for the segment routing policy, expected to be forwarded by the network nodes on the links of the second shortest paths; and provision the second shortest paths in the network of network nodes based on determining, by the computing device based on the bandwidth constraint for the segment routing policy, all links of the second shortest paths have sufficient bandwidth to meet the respective required bandwidths.

12. The computing device of claim 10, wherein the computing device comprises one of a controller for the network or a network node of the network nodes.

13. The computing device of claim 10, wherein the metric of the link is a link bandwidth overflow metric of the link that is separate from a policy metric of the link.

14. The computing device of claim 13, wherein increasing the metric of the link comprises increasing the link bandwidth overflow metric of the link, and wherein to compute the second shortest paths the processing circuitry and memory are configured to:
compute a combined metric of the link as a combination of the link bandwidth overflow metric of the link and the policy metric of the link, and
execute a shortest path algorithm with the combined metric of the link to compute the second shortest paths.

15. The computing device of claim 10,
wherein the processing circuitry and memory are configured to compute one or more lists of segment identifiers to realize the second shortest paths in the network of network nodes, and
wherein to provision the second shortest paths in the network of network nodes the processing circuitry and memory are configured to provision the one or more lists of segment identifiers in an ingress node of the network nodes.

16. The computing device of claim 10, wherein the processing circuitry and memory are configured to:
compute, based on the bandwidth constraint for the segment routing policy, the required bandwidth for the link as an amount of traffic, for the segment routing policy, that would be forwarded by the network nodes on the link.

17. The computing device of claim 10,
wherein the segment routing policy specifies a plurality of sources and a plurality of destinations,
wherein the second shortest paths are a first multipath for a first source of the plurality of sources to at least one of the plurality of destinations, and
wherein the processing circuitry and memory are configured to:
update a link bandwidth for each link used by the first multipath;
compute a second multipath for a second source of the plurality of sources to at least one of the plurality of destinations; and
based on a determination that each link used by the first multipath and the second multipath has sufficient bandwidth for the first multipath and the second multipath, provision the first multipath and the second multipath in the network.

18. The computing device of claim 10, wherein the bandwidth constraint for the segment routing policy comprises an amount of bandwidth that a combined bandwidth of shortest paths through the network of network nodes must satisfy to implement the segment routing policy.

19. A non-transitory computer-readable storage medium encoded with instructions that, when executed, cause one or more processors of a computing device to perform operations comprising:
compute for a segment routing policy that specifies a bandwidth constraint for the segment routing policy, first shortest paths through a network of network nodes, wherein each shortest path of the first shortest paths represents a different sequence of links connecting pairs of the network nodes from a source to a destination;
compute, based on the bandwidth constraint for the segment routing policy, a required bandwidth for a link of one of the first shortest paths as an amount of traffic, for the segment routing policy, expected to be forwarded on the link by the network nodes load balancing the traffic on the first shortest paths;
based on a determination the link has insufficient bandwidth to meet the required bandwidth for the link, increase a metric of the link;
compute, for the segment routing policy according to the increased metric of the link, second shortest paths through the network of network nodes; and
provision the second shortest paths through the network of network nodes.

20. The non-transitory computer-readable storage medium of claim 19, wherein the computing device comprises one of a controller for the network or a network node of the network nodes.

* * * * *